(12) United States Patent
Ramasubramonian et al.

(10) Patent No.: US 11,197,005 B2
(45) Date of Patent: Dec. 7, 2021

(54) CROSS-COMPONENT PREDICTION FOR VIDEO CODING

(71) Applicant: QUALCOMM Incorporated, San Diego, CA (US)

(72) Inventors: Adarsh Krishnan Ramasubramonian, Irvine, CA (US); Geert Van der Auwera, Del Mar, CA (US); Cheng-Teh Hsieh, Del Mar, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 117 days.

(21) Appl. No.: 16/678,041

(22) Filed: Nov. 8, 2019

(65) Prior Publication Data

US 2020/0154115 A1    May 14, 2020

Related U.S. Application Data

(60) Provisional application No. 62/757,606, filed on Nov. 8, 2018, provisional application No. 62/768,660, filed on Nov. 16, 2018.

(51) Int. Cl.
*H04N 19/186* (2014.01)
*H04N 19/159* (2014.01)
(Continued)

(52) U.S. Cl.
CPC ......... *H04N 19/186* (2014.11); *H04N 19/124* (2014.11); *H04N 19/159* (2014.11); *H04N 19/176* (2014.11)

(58) Field of Classification Search
CPC .. H04N 19/186; H04N 19/124; H04N 19/159; H04N 19/176; H04N 19/61; H04N 19/96; H04N 19/103
See application file for complete search history.

(56) References Cited

U.S. PATENT DOCUMENTS 10,045,023 B2 *  8/2018  Pettersson .............. H04N 19/52
2013/0136174 A1    5/2013  Xu et al.
(Continued)

OTHER PUBLICATIONS

Anonymous: "Segmented Regression—Wikipedia, the free encyclopedia", May 29, 2016 (May 29, 2016), XP055433793, pp. 1-4, Retrieved from the Internet:URL:https://web.archive.orgjweb/2016052902 2909/https://en.wikipedia.orgjwiki/Segmented_regression [retrieved on Dec. 11, 2017].

(Continued)

*Primary Examiner* — Boubacar Abdou Tchoussou
(74) *Attorney, Agent, or Firm* — Shumaker & Sieffert, P.A.

(57) ABSTRACT

A video coder determines a boundary luma value and derives a chroma value that corresponds to the boundary luma value. The video coder may derive a first prediction model and a second prediction model based on the derived chroma value. The video coder may use the first prediction model to determine a first set of predicted chroma samples of a prediction block for the current block. The first set of predicted chroma samples corresponds to the luma samples of the prediction block that have values less than or equal to the boundary luma value. The video coder may use the second prediction model to determine a second set of predicted chroma samples of the prediction block. The second set of predicted chroma samples corresponds to the luma samples of the prediction block that have values greater than the boundary luma value.

27 Claims, 9 Drawing Sheets

(51) Int. Cl.
*H04N 19/176* (2014.01)
*H04N 19/124* (2014.01)

(56) References Cited

U.S. PATENT DOCUMENTS

| | | | |
|---|---|---|---|
| 2015/0036745 | A1 | 2/2015 | Hsu et al. |
| 2016/0277762 | A1 | 9/2016 | Zhang et al. |
| 2017/0019672 | A1 | 1/2017 | Kim et al. |
| 2017/0272749 | A1* | 9/2017 | Pettersson ............ H04N 19/136 |
| 2017/0295366 | A1 | 10/2017 | Chen et al. |
| 2017/0366818 | A1 | 12/2017 | Zhang et al. |
| 2018/0077426 | A1 | 3/2018 | Zhang et al. |
| 2020/0252619 | A1* | 8/2020 | Zhang .................. H04N 19/42 |
| 2020/0382795 | A1* | 12/2020 | Zhang .................. H04N 19/159 |
| 2020/0389650 | A1* | 12/2020 | Laroche ............... H04N 19/186 |
| 2020/0413069 | A1* | 12/2020 | Lim ..................... H04N 19/184 |
| 2021/0092396 | A1* | 3/2021 | Zhang .................. H04N 19/186 |
| 2021/0092413 | A1* | 3/2021 | Tsukuba ................ H04N 19/80 |

OTHER PUBLICATIONS

Ari B., et al., "Clustered Linear Regression", Knowledge-Based Systems, vol. 15, No. 3, Mar. 1, 2002 (Mar. 1, 2002), XP055433429, pp. 169-175.
Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG.16 ); URL: http://phenix.int-evry.fr/jvet/,, No. JVET-A1001 Feb. 24, 2016 (Feb. 24, 2016), XP030150000, 27 pages.
Chen J., et al., "CE6.a.4: Chroma intra prediction by reconstructed luma samples", JCTVC-E266, JCTVC meeting, Geneva, Switzerland, Mar. 16-23, 2011, 10 pages.
Chen J., et al., "Algorithm Description of Joint Exploration Test Model 3", Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 Pages.
Ergen S., "ZigBee/IEEE 802.15.4 Summary", Sep. 10, 2004, 37 Pages.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
ITU-T H.223, Series H: Audiovisual and Multimedia Systems, Infastructure of Audiovisual Services—Transmission Multiplexing and Synchronization, Multiplexing Protocol for Low Bit Rate Multimedia Communication, The International Telecommunication Union, Jul. 2001, 74 Pages.
ITU-T H.263, Series H: Audiovisual and Multimedia Systems, Infastructure of audiovisual services—Coding of moving video, Video coding for low bit rate communication, The International Telecommunication Union. Jan. 2005, 226 pp.
ITU-T H.265, "Series H: Audiovisual and Multimedia Systems, Infrastructure of audiovisual services—Coding of moving video, High efficiency video coding," The International Telecommunication Union. Dec. 2016, 664 Pages.
"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.
Laroche G., et al., "CE3-5.1: On Cross-Component Linear Model Simplification", JVET-L0191, Joint Video Exploration Team (JVET) of ITU-T SG 16 WP 3 and ISO/IEC JTC 1/SC 29/WG 11, 12th Meeting: Macao, CN, Oct. 3-12, 2018, pp. 1-4.
Suehring K., et al., "JEVT common test conditions and software reference configurations", 2nd Meeting, Feb. 20 through 26, 20016, San Diego, USA; Joint Collaborative Video Exploration Team (JVET) of ITU-T-SG 16 WP 3 and ISO/IEC JTC 1/SC 29/WG 11, JVET-B1010, Apr. 4, 2016, 4 pp.
Sullivan G.J., et al., "Overview of the High Efficiency Video Coding (HEVC) Standard", IEEE Transactions On Circuits And Systems For Video Technology, vol. 22, No. 12, Dec. 1, 2012 (Dec. 1, 2012), XP055388661, USA ISSN: 1051-8215, DOI: 10.1109/TCSVT.2012. 2221191, pp. 1649-1668, p. 1662, Paragraph 3) Merge Mode.
Zhang K., et al., "EE5: Enhanced Cross-component Linear Model Intra-Prediction", 5th JVET Meeting; Dec. 1, 2017-Jan. 20, 2017; Geneva; (The Joint Video Exploration Team of ISO/IEC JTC1/SC29/WG11 and ITU-T SG.16 ); URL: http://phenix.int-evry.fr/jvet/,No. JVET-E0077, Jan. 4, 2017, XP030150563, 4 pages.
Zhang K., et al., "Enhanced Cross-component Linear Model Intra-Prediction", 4th JVET Meeting; Oct. 15, 2016-Oct. 21, 2016; Chengdu; (The Joint Video Exploration Team of ISO/IEC JTC1/SC29/WG11 and ITU-T SG.16 ); URL: http://phenix.int-evry.fr/jvet/, No. JVET-D0110-v4, Oct. 17, 2016, XP030150355, pp. 1-6.
Zhang K., et al., "Enhanced Cross-component Linear Model Intra-prediction", 4. JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/, No. JVET-D0110, Oct. 6, 2016 (Oct. 6, 2016), XP030150354, 5 Pages.
Zhang X., et al., "New Modes for Chroma Intra Prediction", 7. JCT-VC Meeting; 98. MPEG Meeting; Nov. 21, 2011-Nov. 30, 2011; Geneva; (Joint collaborative Team on Video Coding of ISO/IEC JTC1/SC29/WG11 and ITU-T SG.16); URL: http://WFTP3. ITU.INT/AV-ARCH/JCTVC-SITE/, No. JCTVC-G358, Nov. 10, 2011 (Nov. 10, 2011), XP030110342, 8 Pages.

* cited by examiner

CROSS-COMPONENT PREDICTION FOR VIDEO CODING

CROSS-COMPONENT PREDICTION FOR VIDEO CODING

This application claims the benefit of U.S. Provisional Patent Application 62/757,606, filed Nov. 8, 2018, and U.S. Provisional Patent Application 62/768,660, filed Nov. 16, 2018, the entire content of each of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for cross-component prediction in video coding. The example techniques are described with respect to multi-model linear prediction model (MMLM). In linear prediction model (LM) modes, a predicted block for a sample values of a first type (e.g., a predicted block for chroma samples) is generated from a reconstructed block of a values of a second type (e.g., a down-sampled block of luma samples) and one or more scaling parameters. In MMLM, there may be a plurality of prediction models. In accordance with one or more techniques of this disclosure, a video encoder and a video decoder may determine a boundary luma value that separates a first class of neighboring luma samples and a second class of neighboring luma samples. The first class of neighboring luma samples are those ones of the neighboring luma samples that have values less than or equal to the boundary luma value. The second class of neighboring luma samples are those ones of the neighboring luma samples that have values greater than the boundary luma value. The neighboring luma samples neighbor a current block of the video data. The video encoder and video decoder may derive a chroma value that corresponds to the boundary luma value. Additionally, the video encoder and the video decoder may derive a first prediction model and a second prediction model based on the derived chroma value. The video encoder and the video decoder may use the first prediction model to determine a first set of predicted chroma samples of a prediction block for the current block. The first set of predicted chroma samples corresponds to the luma samples of the prediction block that have values less than or equal to the boundary luma value. In addition, the video encoder and the video decoder may use the second prediction model to determine a second set of predicted chroma samples of the prediction block. The second set of predicted chroma samples corresponds to the luma samples of the prediction block that have values greater than the boundary luma value.

In some examples, the first prediction model uses a first parameter and a second parameter used to scale a first set of values of the reconstructed block (e.g., values of the reconstructed block less than or equal to the threshold), and the second prediction model uses a third parameter and a fourth parameter used to scale a second set of values of the reconstructed block (e.g., values of the reconstructed block greater than the threshold). This disclosure describes example techniques to determine the example scaling parameters (e.g., one or more of the first, second, third, and fourth parameters).

In one example, this disclosure describes a method of decoding video data, the method comprising: determining a boundary luma value that separates a first class of neighboring luma samples and a second class of neighboring luma samples, the first class of neighboring luma samples being those ones of the neighboring luma samples that have values less than or equal to the boundary luma value, the second class of neighboring luma samples being those ones of the neighboring luma samples that have values greater than the boundary luma value, wherein the neighboring luma samples neighbor a current block of the video data; deriving a chroma value that corresponds to the boundary luma value; deriving a first prediction model and a second prediction model based on the derived chroma value; using the first prediction model to determine a first set of predicted chroma samples of a prediction block for the current block, the first set of predicted chroma samples corresponding to the luma samples of the prediction block that have values less than or equal to the boundary luma value; using the second prediction model to determine a second set of predicted chroma samples of the prediction block, the second set of predicted chroma samples corresponding to the luma samples of the prediction block that have values greater than the boundary luma value; and reconstructing the current block based at least in a part on the prediction block for the current block and a residual block for the current block.

In another example, this disclosure describes a method of encoding video data, the method comprising: determining a boundary luma value that separates a first class of neighboring luma samples and a second class of neighboring luma samples, the first class of neighboring luma samples being those ones of the neighboring luma samples that have values less than or equal to the boundary luma value, the second class of neighboring luma samples being those ones of the neighboring luma samples that have values greater than the boundary luma value, wherein the neighboring luma samples neighbor a current block of the video data; deriving a chroma value that corresponds to the boundary luma value; deriving a first prediction model and a second prediction model based on the derived chroma value; using the first prediction model to determine a first set of predicted chroma samples of a prediction block for the current block, the first set of predicted chroma samples corresponding to the luma samples of the prediction block that have values less than or equal to the boundary luma value; using the second prediction model to determine a second set of predicted chroma samples of the prediction block, the second set of predicted chroma samples corresponding to the luma samples of the prediction block that have values greater than the boundary luma value; and generating a residual block for the current block based at least in part on the prediction block for the current block and chroma samples of the current block.

In another example, this disclosure describes a device for coding video data, the device comprising: a memory configured to store the video data; and processing circuitry coupled to the memory and configured to: determine a boundary luma value that separates a first class of neighboring luma samples and a second class of neighboring luma samples, the first class of neighboring luma samples being those ones of the neighboring luma samples that have values less than or equal to the boundary luma value, the second class of neighboring luma samples being those ones of the neighboring luma samples that have values greater than the boundary luma value, wherein the neighboring luma samples neighbor a current block of the video data; derive a chroma value that corresponds to the boundary luma value; derive a first prediction model and a second prediction model based on the derived chroma value; use the first prediction model to determine a first set of predicted chroma samples of a prediction block for the current block, the first set of predicted chroma samples corresponding to the luma samples of the prediction block that have values less than or equal to the boundary luma value; and use the second prediction model to determine a second set of predicted chroma samples of the prediction block, the second set of predicted chroma samples corresponding to the luma samples of the prediction block that have values greater than the boundary luma value.

In another example, this disclosure describes a device for coding video data, the device comprising: means for determining a boundary luma value that separates a first class of neighboring luma samples and a second class of neighboring luma samples, the first class of neighboring luma samples being those ones of the neighboring luma samples that have values less than or equal to the boundary luma value, the second class of neighboring luma samples being those ones of the neighboring luma samples that have values greater than the boundary luma value, wherein the neighboring luma samples neighbor a current block of the video data; means for deriving a chroma value that corresponds to the boundary luma value; means for deriving a first prediction model and a second prediction model based on the derived chroma value; means for using the first prediction model to determine a first set of predicted chroma samples of a prediction block for the current block, the first set of predicted chroma samples corresponding to the luma samples of the prediction block that have values less than or equal to the boundary luma value; and means for using the second prediction model to determine a second set of predicted chroma samples of the prediction block, the second set of predicted chroma samples corresponding to the luma samples of the prediction block that have values greater than the boundary luma value.

In another example, this disclosure describes a computer-readable data storage medium having instructions stored thereon that, when executed, cause a computing device to: determine a boundary luma value that separates a first class of neighboring luma samples and a second class of neighboring luma samples, the first class of neighboring luma samples being those ones of the neighboring luma samples that have values less than or equal to the boundary luma value, the second class of neighboring luma samples being those ones of the neighboring luma samples that have values greater than the boundary luma value, wherein the neighboring luma samples neighbor a current block of the video data; derive a chroma value that corresponds to the boundary luma value; derive a first prediction model and a second prediction model based on the derived chroma value; use the first prediction model to determine a first set of predicted chroma samples of a prediction block for the current block, the first set of predicted chroma samples corresponding to the luma samples of the prediction block that have values less than or equal to the boundary luma value; and use the second prediction model to determine a second set of predicted chroma samples of the prediction block, the second set of predicted chroma samples corresponding to the luma samples of the prediction block that have values greater than the boundary luma value.

The details of one or more examples are set forth in the accompanying drawings and the description below. Other features, objects, and advantages will be apparent from the description, drawings, and claims.

DETAILED DESCRIPTION

Figure 1:
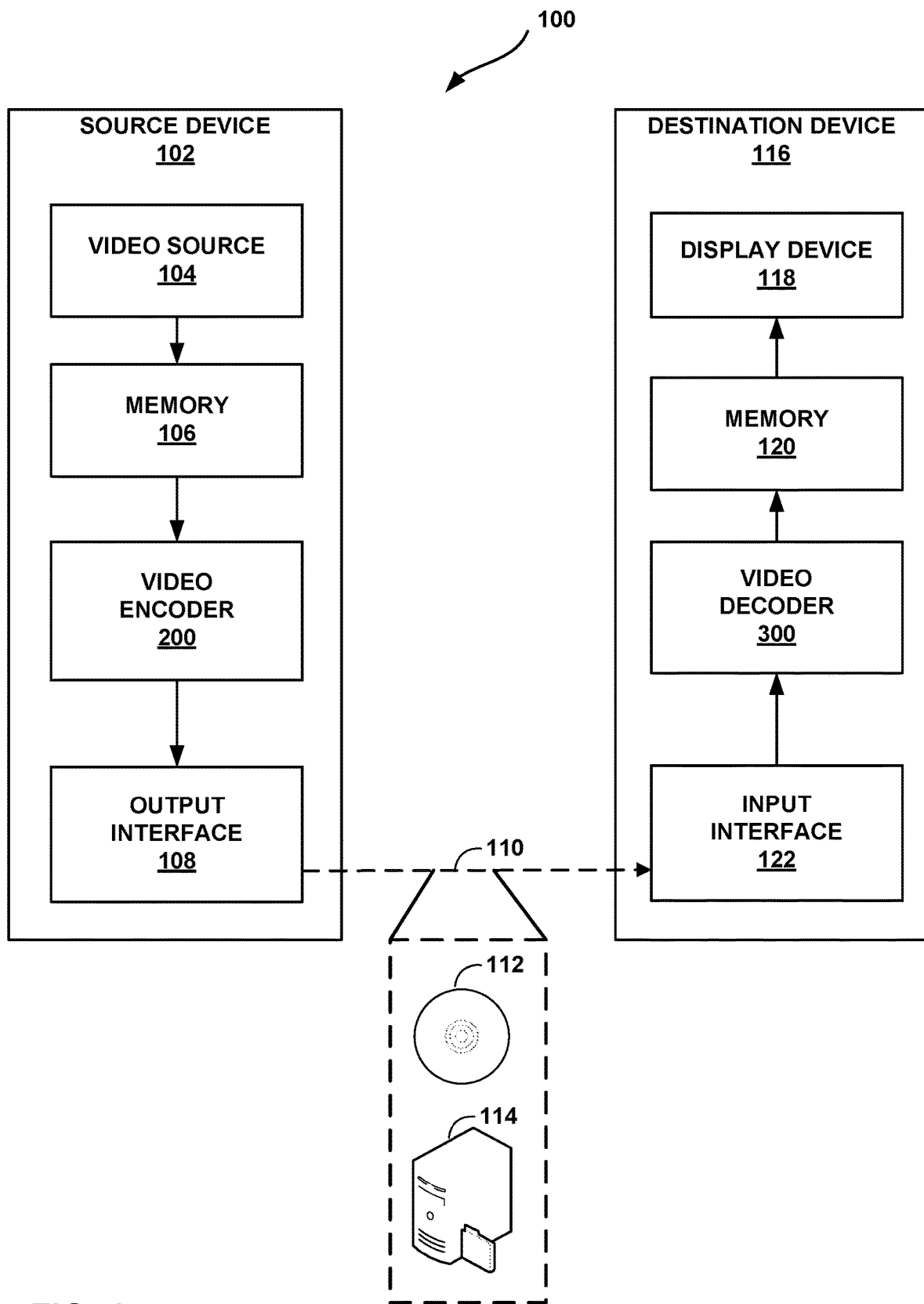
FIG. 1 is a block diagram illustrating an example video encoding and decoding system that may perform the techniques of this disclosure.

In many video coding standards, a picture includes a set of luma samples and two sets of chroma samples. It is a common occurrence that the values of the chroma samples of individual blocks of a picture are correlated with the values of corresponding luma samples. For example, the chroma samples corresponding to luma samples with greater values may also have greater values. Because of this relationship between values of chroma samples and values of corresponding luma samples, the values of the chroma samples may be predicted in part based on the values of the corresponding luma samples.

However, there may be multiple groups of chroma samples within a block that have different relationships with the values of corresponding luma samples. For example, a first linear model may be better than a second model at approximating the relationship between values of chroma samples that corresponds to luma samples having values less than a boundary luma value. In this example, the second linear model may be better than the first linear model at approximating the relationship between values of the chroma samples that correspond to luma samples having values greater than the boundary luma value. Thus, multi-model linear model (MMLM) techniques have been developed. A video coder may use samples that neighbor a current block to determine parameters of the linear models. This disclosure uses the term "video coder" to refer in general to video encoders and video decoders.

However, use of MMLM techniques may cause visible artifacts when predicting a value of a chroma sample based on a corresponding luma sample whose value is at or close to the boundary luma value. This is because there may be a large difference in the predicted value of the chroma samples for small differences in values of luma samples when the values of the luma samples straddle the boundary luma value. The visible artifacts may diminish the user experience. Moreover, the large differences in the predicted values of chroma samples for small differences in values of luma samples may result in larger prediction errors for the predicted values of the chroma samples. A prediction error for a predicted value of a chroma sample is a difference between the predicted value of the chroma sample and an actual value of the chroma sample. The larger prediction errors may lead to decreased coding efficiency and increased bitstream size.

In accordance with one or more techniques of this disclosure, a video coder may determine a derived chroma value that corresponds to the boundary luma value. The derived chroma value does not necessarily match the value of any chroma sample of the neighboring samples of the current block. The video coder may use the derived chroma value to derive at least one prediction model. Using the derived chroma value to derive the prediction model may reduce the differences in predicted values of chroma samples corresponding to luma samples having values on opposite sides of the luma boundary value.

Thus, in accordance with an example of this disclosure, a video coder may determine a boundary luma value that separates a first class of neighboring luma samples and a second class of neighboring luma samples. The first class of neighboring luma samples are those ones of the neighboring luma samples that have values less than or equal to the boundary luma value. The second class of neighboring luma samples are those ones of the neighboring luma samples that have values greater than the boundary luma value. The neighboring luma samples neighbor a current block of the video data. Furthermore, in this example, the video coder may determine a derived chroma value that corresponds to the boundary luma value. The video coder may also derive a first prediction model based on the derived chroma value. The video coder may use the first prediction model to determine a first set of predicted chroma samples of a prediction block for the current block. In this example, the first set of predicted chroma samples corresponding to the luma samples of the prediction block that have values less than or equal to the boundary luma value. Furthermore, in this example, the video coder may use a second prediction model to determine a second set of predicted chroma samples of the prediction block. The second set of predicted chroma samples corresponds to the luma samples of the prediction block that have values greater than the boundary luma value.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may include any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for cross-component prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for cross-component prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 include video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry (e.g., processing circuitry), such as one or more microprocessors, digital signal processors (DSPs), application specific integrated circuits (ASICs), field programmable gate arrays (FPGAs), discrete logic, software, fixed function circuitry, programmable processing circuitry, hardware, firmware, hardware implementing software, or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266/Versatile Video Coding (VVC). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM and/or VVC. According to JEM or VVC, a video coder (such as video encoder 200) partitions a picture into a plurality of CTUs. Video encoder 200 may partition a CTU according to a tree structure, such as a quadtree-binary tree (QTBT) structure or a Multi Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

Figure 2A:
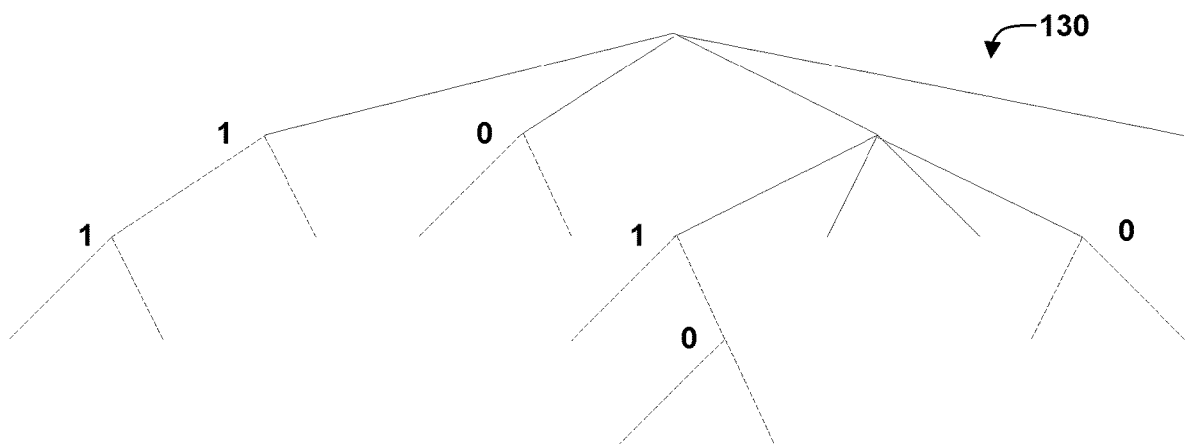
FIGS. 2A and 2B are conceptual diagrams illustrating an example quadtree binary tree (QTBT) structure, and a corresponding coding tree unit (CTU).
Figure 2B:
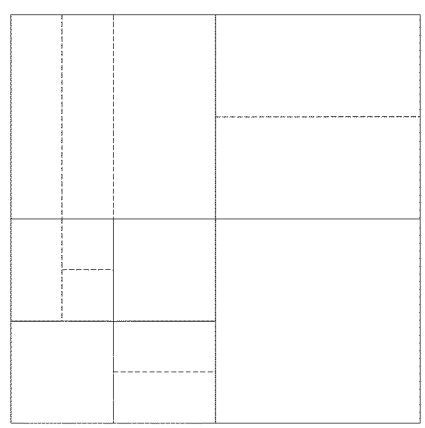

FIGS. 2A and 2B are conceptual diagrams illustrating an example QTBT structure 130, and a corresponding CTU 132. The solid lines in FIG. 2A and FIG. 2B represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, then the node may not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When a binary tree node has a width equal to MinBTSize (4, in this example) implies no further horizontal splitting is permitted. Similarly, a binary tree node having a height equal to MinBTSize implies no further vertical splitting is permitted for that binary tree node. As noted above, leaf nodes of the binary tree are referred to as CUs and are further processed according to prediction and transform without further partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, video encoder 200 and video decoder 300 may be configured to code blocks of video data using cross-component linear model (CCLM) mode. In general, in CCLM mode, there is a prediction model (also referred to as a linear model), in which a predicted block for samples of a first type are determined based on sample values of a second type and one or more scaling parameters. As one example, a predicted block may be a predicted block for a chroma block, and the predicted block is determined based on down-sampled luma samples that form a reconstructed luma block and the scaling parameters, referred to as alpha ($\alpha$) and beta ($\beta$). In single-model LM (SMLM) mode, there is one prediction model. In multi-model linear model (MMLM) mode, there are a plurality of prediction models.

For example, in SMLM mode, a linear prediction model is used to predict the chroma samples from the luma samples as follows:

$$\text{pred}_C(i,j) = \alpha \cdot \text{rec}_L'(i,j) + \beta \quad (1)$$

In equation (1) above, $\text{pred}_C(i,j)$ denotes a predicted value of a chroma sample at location (i, j). $\text{rec}_L'(i,j)$ denotes reconstructed value of a luma sample at location (i, j). Furthermore, in the equation above, $\alpha$ and $\beta$ are parameters of the linear prediction model.

The reconstructed luma samples (which may be down-sampled depending on chroma format) (e.g., $\text{rec}_L'(i, j)$) and chroma samples from the top and left neighboring blocks are used to derive the parameters ($\alpha$ and $\beta$) of the prediction model at video encoder 200 and video decoder 300. The parameters are then used by video encoder 200 and video decoder 300 to derive the chroma sample prediction of the current CU from the reconstructed luma samples of the current CU (e.g., derive $\text{pred}_C(i,j)$, which is the predicted block).

In some cases, a least-mean-square approach is chosen to derive the parameters by reducing the prediction error of the samples. In other approaches, a min-max approach, such as that described in G. Laroche, J. Taquet, C. Gisquet, P. Onno, *CE3: Cross-component linear model simplification (Test 5.1)*, JVET-L0191, October 2018, Macau, China, (or similar) may be applied where the minimum and the maximum luma values of the samples, and their corresponding chroma values, are used to derive the linear model. Specifically, in the min-max approach, parameters are determined so that a linear model defined by the parameters describes a line passing from a luma-chroma pair with a minimum luma value to a luma-chroma pair having a maximum luma value.

In this disclosure, the terms "linear model" and "prediction model" are used interchangeably.

In MMLM mode, there can be more than one linear model between the luma samples and chroma samples in a CU. In MMLM mode, a video coder may classify neighboring luma samples and neighboring chroma samples of the current block into several groups. The video coder may use each group as a training set to derive a linear model (i.e., particular $\alpha$ and $\beta$ are derived for a particular group) corresponding to the group. Furthermore, the video coder may also classify the samples of the current luma block based on the same rule used for classifying neighboring luma samples. As one example, the video coder may classify the neighboring samples into two groups. In this example, the first group may consist of those neighboring luma samples having values less than or equal to a threshold and the second group may consist of those neighboring luma samples having values greater than the threshold. The techniques may be an additional chroma prediction mode that may be used along with the single-model LM mode. Video encoder 200 may use a Rate-Distortion Optimization process to choose an optimal mode. Video encoder 200 may signal the chosen mode.

Figure 3:
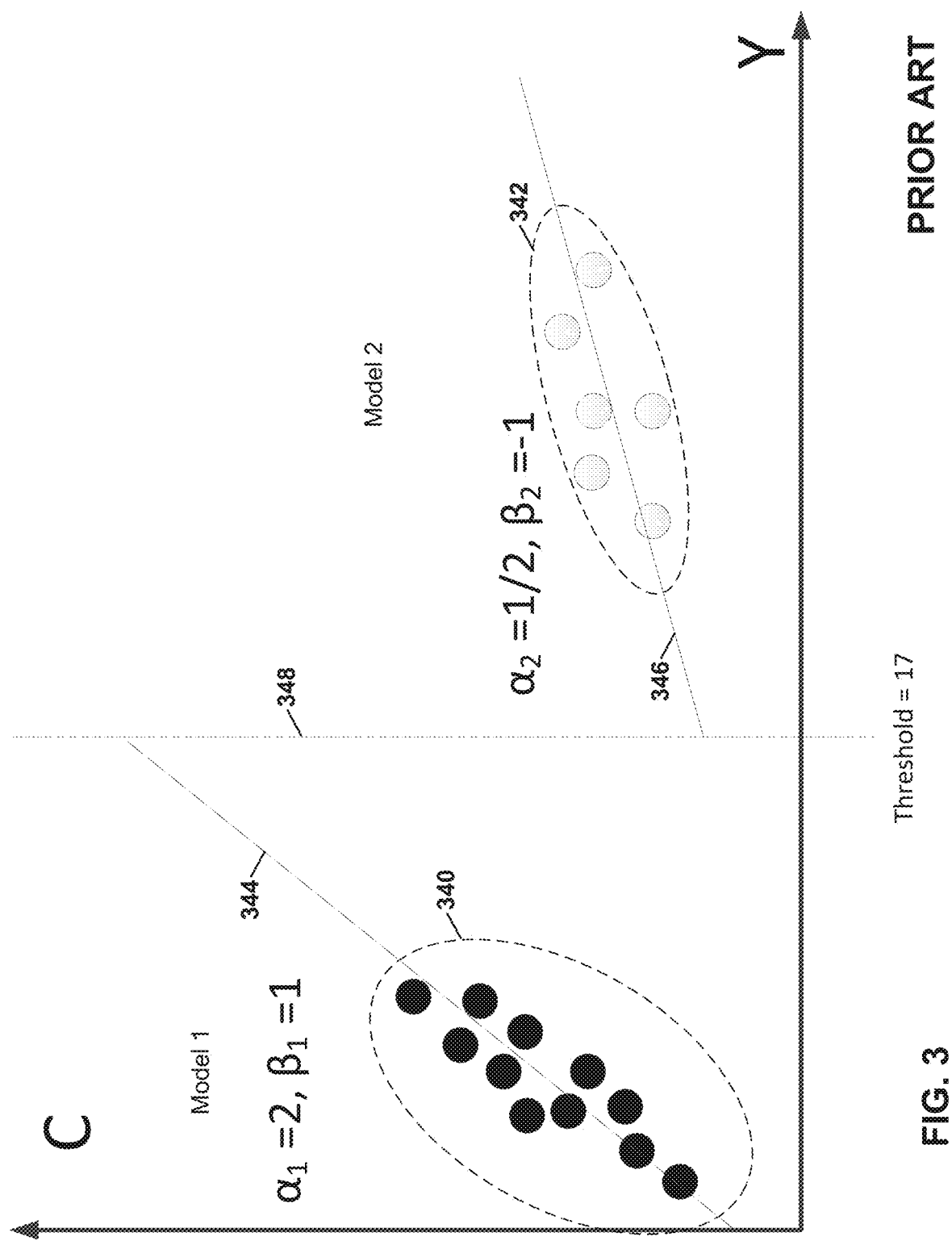
FIG. 3 is a conceptual diagram of two linear models for neighboring coded luma samples that are classified into two groups.

FIG. 3 is a conceptual diagram of two linear models (e.g., prediction models) for neighboring coded luma samples that are classified into 2 groups. FIG. 3 shows an example of classifying the neighboring samples into two groups. A value denoted "Threshold" may be calculated as the average value of the neighboring reconstructed luma samples. The neighboring reconstructed luma samples may be luma samples that are in one or more rows adjacent to a top row of the current block and/or one or more columns adjacent to a leftmost column of the current block. A neighboring sample with $\text{Rec}'_L[x,y] \leq \text{Threshold}$ is classified into group 1; while a neighboring sample with $\text{Rec}'_L[x,y] > \text{Threshold}$ is classified into group 2. In the example of FIG. 3, reference number 200 refers to group 1 and reference number 202 refers to group 2. Two models are derived as:

$$\begin{cases} Pred_C[x, y] = \alpha_1 \times Rec'_L[x, y] + \beta_1 & \text{if } Rec'_L[x, y] \leq \text{Threshold} \\ Pred_C[x, y] = \alpha_2 \times Rec'_L[x, y] + \beta_2 & \text{if } Rec'_L[x, y] > \text{Threshold} \end{cases} \quad (2)$$

In equation (2), $Pred_C[x,y]$ indicates a value of a chroma sample of a prediction block of the current block at location (x, y), $\alpha_1$, $\beta_1$ are parameters of a first prediction model (e.g., a first parameter and a second parameter of a first prediction model), $\alpha_2$, $\beta_2$ are parameters of a second prediction model (e.g., a first parameter and a second parameter of the second prediction model). In some instances, this disclosure may refer to $\alpha_2$, $\beta_2$ as a third and a fourth parameter to differentiate $\alpha_2$, $\beta_2$ from $\alpha_1$, $\beta_1$.

In FIG. 3, after neighboring samples are classified into two classes (i.e., class 340 and class 342), video encoder 200 and video decoder 300 may be configured to derive two independent linear models (e.g., prediction models), separately, based on the two classes as depicted in FIG. 3. In the example of FIG. 3, the two linear models may be obtained for the two classes as:

$$\begin{cases} Pred_C[x, y] = 2 \times Rec'_L[x, y] + 1 & \text{if } Rec'_L[x, y] \leq \text{Threshold MODEL 1} \\ Pred_C[x, y] = 0.5 \times Rec'_L[x, y] - 1 & \text{if } Rec'_L[x, y] > \text{Threshold MODEL 2} \end{cases}$$

For instance, there are two linear models: a first linear model for a first set of values of the reconstructed block (e.g., values of $\text{rec}_L'$ that are less than or equal to threshold), and a second linear model for a second set of values of the reconstructed block (e.g., values of $\text{rec}_L'$ that are greater than threshold). There may be two parameters for the first model (e.g., a first parameter ($\alpha_1$) and a second parameter ($\beta_1$)), and two parameters for the second model (e.g., a third parameter ($\alpha_2$) and a fourth parameter ($\beta_2$)), for a total of four parameters. Additional description of MMLM is available from U.S. patent application Ser. No. 15/705,029 filed Sep. 14, 2017.

There may be one or more issues with MMLM mode. For example, when more than one set of parameters are used to estimate the parameters of luma-to-chroma prediction; or, in particular, two models are used, the performance of the mapping process at the boundary of the two parameter models is unclear. For example, if the mean value of the luma reference samples is used to separate the classes of samples to derive the respective two luma-to-chroma prediction models, an independent derivation of parameters may result in adjacent/nearby luma values of the two classes on either side of boundary mapping to considerably different chroma values. This could result in larger prediction errors. In some cases when the residual error may not be coded with high precision, such prediction errors result in artifacts that may have a visually adverse impact on the quality of video.

For example, assume that the threshold is 10. In this example, a luma sample $\text{rec}_L'(1, 1)$ having a value of 5 would have a $\text{pred}_C(1,1)$ value determined based on the first prediction model (e.g., because 5 is less than 10). A luma sample $\text{rec}_L'(1, 2)$ having a value of 15 would have a $\text{pred}_C(1,2)$ value determined based on the second prediction model (e.g., because 15 is greater than 10). In this example, it may be possible that the value of $\text{pred}_C(1,1)$ is significantly different from the value of $\text{pred}_C(1,2)$ because a first parameter ($\alpha_1$) and a second parameter ($\beta_1$) for the first prediction model, and a third parameter ($\alpha_2$) and a fourth parameter ($\beta_2$) for the second prediction model are independently derived, even though these are chroma predictors for chroma values of neighboring luma samples that are not much different in value. Similarly, with respect to the example of FIG. 3, line 344 corresponds to linear model 1 and line 346 corresponds to linear model 2. The intercept of line 204 with the line 208 corresponding to a threshold of 17 is much greater than the intercept of line 346 with line 348. Thus, in the example of FIG. 3, a value of a chroma sample of the prediction block of the current block corresponding to a reconstructed luma sample of the current block equal to 17 may be significantly different from a value of a chroma value of the prediction block of the current block corresponding to a reconstructed luma sample of the current block equal to 18. In other words, there may be significantly different predictions for chroma samples corresponding to luma samples with values 17 and 18, despite there being only a small difference between luma samples with values 17 and 18.

This disclosure describes techniques that may address one or more of these issues with MMLM mode. For instance, the following describes one or more example techniques to determine one or more parameters of linear models used in MMLM mode. The examples of this disclosure may be applied independently, or one or more examples may be applicable together.

For each boundary where the samples are separated, video encoder 200 and video decoder 300 may define a luma boundary value, which also may be referred to herein as a threshold. The luma boundary value may be used to ensure that prediction models on either side of the boundary do not result in a (substantial) difference between the predicted value of the two models at the boundary. For instance, if a value for $\text{rec}_L(i,j)$ were determined at the boundary, and this value (e.g., $\text{rec}_L(i,j)$) was used in the first prediction model with the first parameter and the second parameter, the resulting value for $\text{pred}_C(i,j)$ may be substantially equal if this value (e.g., $\text{rec}_L(i,j)$) was used in the second prediction model with the third parameter and the fourth parameter.

In some examples, video encoder 200 and video decoder 300 may derive a first prediction model and a second prediction model based on a derived chroma value. For instance, in one or more examples, video encoder 200 and video decoder 300 may be configured to determine a derived chroma value used to determine one or more of the first, second, third, and fourth parameters to ensure that the condition that the predicted value using the two models at the boundary results in substantially the same predicted value (e.g., within +10%).

For example, if Y1 is the boundary value that separates two classes of samples (e.g., a first group of luma samples that have values less than or equal to Y1, and a second group of luma samples that have values greater than Y1), and Ya is a luma sample value smaller than or equal to Y1 (e.g., the largest luma sample smaller than or equal to Y1; that is, the luma sample with largest value in the first group), and Yb is a luma sample value larger than Y1 (e.g., the smallest luma sample value larger than Y1; that is, the luma sample with smallest value in the second group), then the luma-chroma tuple, Y1 and c (where "c" is also referred to as a derived chroma value corresponding to the luma value Y1), may be included in the derivation of one or more of the prediction models (e.g., in derivation of one or more of the first, second, third, and fourth parameters for a first and a second prediction model). In this example, "c" (e.g., the derived chroma value) may be derived from the mapped values of samples of either classes, such as average of Cx and Cy, where Cx and Cy are the corresponding chroma samples of a particular Ya and Yb, respectively. For instance, the derived chroma value may be the average of Cx and Cy, where Cx is the chroma value of the chroma sample corresponding to the luma sample Ya, and Cy is the chroma value of the chroma sample corresponding to the luma sample Yb.

As one example, when a min-max approach is used to derive the parameters of the two classes, the parameters may be derived as follows:

$$\alpha_1=(c-Cy)/(Y1-Yb);$$

$$\beta_1=Cy-\alpha 1*Yb;$$

$$\alpha_2=(c-Cx)/(Y1-Ya);$$

$$\beta_1=Cx-\alpha 2*Ya; \quad (3)$$

In some examples, the term "chroma sample" is applied in this disclosure to Cb and Cr, independently or jointly. For instance, in some examples where video encoder 200 and video decoder 300 apply the derived chroma sample to Cb and Cr independently, a video coder may determine different chroma values for Cb and Cr based on the Cb and Cr values of the reconstructed neighboring samples, respectively. Thus, the video coder may derive two linear models for Cb and two linear models for Cr, e.g., using equations (3) or in accordance with other examples of this disclosure. In examples where video encoder 200 and video decoder 300 apply the derived chroma sample to Cb and Cr jointly, the video coder may use the same linear models for Cb and Cr.

Furthermore, in some examples, the boundary may not be defined by just one sample, or one dimension, and may involve more than one dimension, e.g., the mapping model to predict samples in the Cr domain may be based on both luma values as well as Cb values. When only luma is used for predicting Cb or Cr samples in earlier examples, it was shown that a boundary value(s) separate two (or more) luma sample classes. When the both luma and Cb samples are used to predict Cr, the "boundary" may no longer be a point but rather a line in the Y-Cb space. For instance, the average luma value and the neutral Cb value (value of 512 when the Cb value is in the range of 0 to 1023) may be used to derive two such lines so that four classes may be defined. Samples that have a luma value smaller than or equal to the boundary value and Cb values smaller than or equal to the neutral Cb value may belong to the first class; samples that have luma value greater than the boundary value and Cb values smaller than or equal to the neutral Cb value may belong to the second class; samples that have a luma value smaller than equal to the boundary value and Cb values greater than the neutral Cb value may belong to the third class; samples that have a luma value greater than the boundary value and Cb values greater than the neutral Cb value may belong to the fourth class. The boundaries may be visualized using lines in the Y-Cb space, derived from one or more samples (e.g., boundary luma value and neutral Cb value). The prediction modes for the four classes may be derived separately.

In some examples, the sample values used to estimate the parameters of the two prediction models may include, but are not limited to, reference samples from neighboring blocks. For instance, in some examples, video encoder 200 and video decoder 300 may derive the samples used for the parameter estimation from one or more of reference samples of neighboring blocks, reconstructed samples, samples that are collocated to the current block in other pictures, or samples in other pictures that are collocated with the neighboring block of the current block.

In some examples, the luma boundary value and the prediction models are defined such that the difference between the value of the predictions on either side of the luma boundary value does not exceed a threshold value T. In some examples, the threshold value T is predetermined. In other examples, the threshold value T is signaled in the bitstream. For example, when two linear models (i.e., a first linear model and a second linear model) share a prediction boundary, when the prediction value of the first linear model is c1 at the prediction boundary (e.g., $\text{pred}_C(i,j)$ at the prediction boundary using the first linear model is c1), and the prediction value of the second linear model is c2 at the prediction boundary (e.g., $\text{pred}_C(i,j)$ at the prediction boundary using the second linear model is c2), then the absolute difference between c1 and c2 is restricted to not exceed a value T, where T is the threshold difference. A video coder may ensure that the threshold is not exceeded in one or more ways. For instance, in some examples, the video coder may update the model parameters in a pre-determined manner (e.g., iterate through some step sizes in the direction that reduces the difference in the chroma prediction at the boundaries).

In some examples, the models (e.g., prediction or linear models) for the respective classes may be derived by taking an additional term in the minimization equation, which reduces the error of the predicted values of the two models at the boundary. For example, a joint optimization with two sets of respective parameters, and the sum of the prediction error terms and a function of the difference of the predicted values of the two models at the boundary is minimized. In some examples, a lambda factor (e.g., Lagrange multiplier) may be introduced to bring in trade-off in the relative importance of reducing the model error versus reducing the error of predicted values at the boundary. The lambda value may be fixed or included as part of the bitstream.

For example, let e1(x, y) denote the error for predicting a chroma sample from the neighboring luma samples using the first prediction model for the first class, where (x, y) denotes a sample location of a luma sample that belongs to the first class; e1(x, y) may be derived as [Cb(x, y)–α*Y(x, y)–β], where Y(x, y) denotes the luma sample belonging to the first class and Cb(x, y) is a chroma sample corresponding to the luma sample. Let E1 denote the sum of square errors, i.e., sum of square of e1(x, y), for all the neighboring luma samples used for the parameter derivation that correspond to the samples in the first class. Similarly, let E2 denote the sum of errors for all the samples in the second class derived using the second prediction model. In some examples described above, least-mean-square method may minimize E1 and E2 independently, to derive the first and second parameter from E1 and third and fourth parameter from E2. For joint optimization, the cost term J=E1+E2 may be minimized. To reduce the chroma prediction difference at the boundary the cost term J may be set as $J=E1+E2+\lambda(\alpha 1*Y+\beta_1-\alpha 2*Y-\beta_1)^2$, where the last term denotes the square of difference in the chroma prediction values using the two prediction models at the boundary, and λ, is control parameter. Minimizing this J term reduced the prediction error and also reduces the chroma prediction difference at the boundary.

In some example, one or more values may be signaled in the bitstream to adjust the prediction errors of the samples that are close to the boundary. In some cases, these values may be applied within a certain distance from the boundary values, where the distance may be pre-determined or indicated/signaled in the bitstream. For example, video encoder 200 may signal adjustment values for one or more of the predicted samples of the predicted block (e.g., the values that are signaled to adjust the prediction errors are the adjustment values), where the predicted samples of the predicted block are the $\text{pred}_C(i,j)$ values.

Video decoder 300 may receive adjustment values for one or more of the predicted samples of the predicted block (e.g., the values that video encoder 200 signals to adjust the prediction errors are the adjustment values video decoder 300 receives), where the predicted samples of the predicted block are the $\text{pred}_C(i,j)$ values. Video decoder 300 may then adjust the predicted samples of the predicted blocks based on the adjustment values. For example, when the four parameters of the prediction model result in a large difference in the chroma prediction at the boundary value, video encoder 200 may signal an indication that an adjustment value may be necessary to reduce the artifacts. The indication may either be accompanied by an adjustment value or may be an indication to video decoder 300 to derive an adjustment value. The adjustment value may be applied to samples that are close to the boundary value and may involve a linear correction term such that a difference in the chroma prediction values from the two models is reduced. For instance, a sample may be considered to be close to the boundary value when the distance of the sample from the boundary value is smaller than a threshold value. This threshold may be different for the different models. For example, let the chroma prediction value at the boundary from the first and second model be c1 and c2, respectively; let c' be equal to the average of c1 and c2. Let Ya be the largest luma value smaller than or equal to the boundary value Y', with C'a being the predicted chroma value for the first model for Ya, and Yb be the smaller luma value greater than the boundary value, and C'b be the predicted chroma value derived from the second model for Yb. The adjustment values may be derived for the first model for a value y in the range of Ya to Y' as C'a+(c'−C'a)/(Y'−Y'a)*(y−Y'a)−($\alpha 1$*y+$\beta_1$); this value is added to the predicted value of y. Similarly, the adjustment value equal to C'b+(c'−C'b)/(Y'−Y'b)*(y−Y'b)−($\alpha 2$*y+$\beta_2$) may be added to the predicted value of y using the second model for values of y in the range of Y' to Yb. This adjustment results in a continuous chroma prediction value across the boundary for the two models.

In some examples, one or more of these classes may be derived and the prediction models may be adjusted such that the values of the predicted samples at either side of the boundaries is reduced. For instance, in some examples, parameters of a first model (e.g., first and second parameters) (for one of the classes) may be derived. The parameters of a second model (e.g., third and fourth parameters) of one or more adjacent classes (e.g., prediction models that are based on a common threshold value) may be derived by constraining the second model to be continuous/smooth with the predicted value of the first model at the boundary shared by the two models.

In some examples where the prediction models are adjusted to reduce differences between predicted values of chroma samples corresponding to luma samples having values on either side of the luma boundary value, parameters of a first model (for one of the classes) may be derived, e.g., using one or more of the examples for determining parameters provided elsewhere in this disclosure. Furthermore, in this example, video encoder 200 and video decoder 300 may derive the parameters of a second model for one or more adjacent classes by constraining the difference between a predicted value of the second model and a predicted value of the first model at the boundary so that the difference does not exceed a threshold value. Adjacent classes are classes that share a boundary. The threshold value may be fixed or indicated/signaled in the bitstream. This constraint may either be enabled by an iterative approach to adjust the value of the model parameters until this condition is satisfied or using a minimization approach where the difference in the predicted chroma values is constrained to be less than a threshold. Minimization of cost functions for such constrained variables is well-known and any minimization method may be applied to derive the model parameters.

In some examples, video encoder 200 and video decoder 300 may derive the prediction models for any one component from another component, e.g., green to red, or green to blue. Accordingly, the example techniques described in this disclosure are not limited to chroma and luma samples and may be extended to other color schemes (e.g., red-green-blue (RGB)). For instance, references in this disclosure to luma samples may be replaced by references to green samples and references in this disclosure to chroma samples may be replaced by references to red samples, etc.

In some examples, video encoder 200 and video decoder 300 may apply the example techniques described in this disclosure for reducing the differences between the predicted values at the boundaries only to certain block sizes. For instance, in some examples, video encoder 200 and video decoder 300 may apply the techniques of this disclosure only to blocks with size smaller than NxK where N denotes the width of a block and K denotes the height of a block.

Although the description above describes block sizes as one of the features of a block (or neighboring block) used to determine the parameters of LM mode coding (e.g., linear model), video encoder 200 and video decoder 300 may use other characteristics including, but not limited to, gradient, sample values in the block, whether the block is padded or not, whether intra mode is used to code the block, and/or other factors to determine the parameters. A block may represent any set of samples used in video coding, e.g., a CTU, CU, prediction unit (PU) or a transform unit (TU). One or more of syntax elements specified may instead be signaled as part of the bitstream, either in a parameter set or part of the slice. Moreover, although the description of the example techniques is with respect to LMS (least-mean-square)-type approach to parameter estimation, the example techniques described in this disclosure may also apply to other techniques of parameter estimation (e.g., min-max approach in G. Laroche, J. Taquet, C. Gisquet, P. Onno, *CE3: Cross-component linear model simplification* (*Test 5.1*), JVET-L0191, October 2018, Macau, China).

Figure 4:
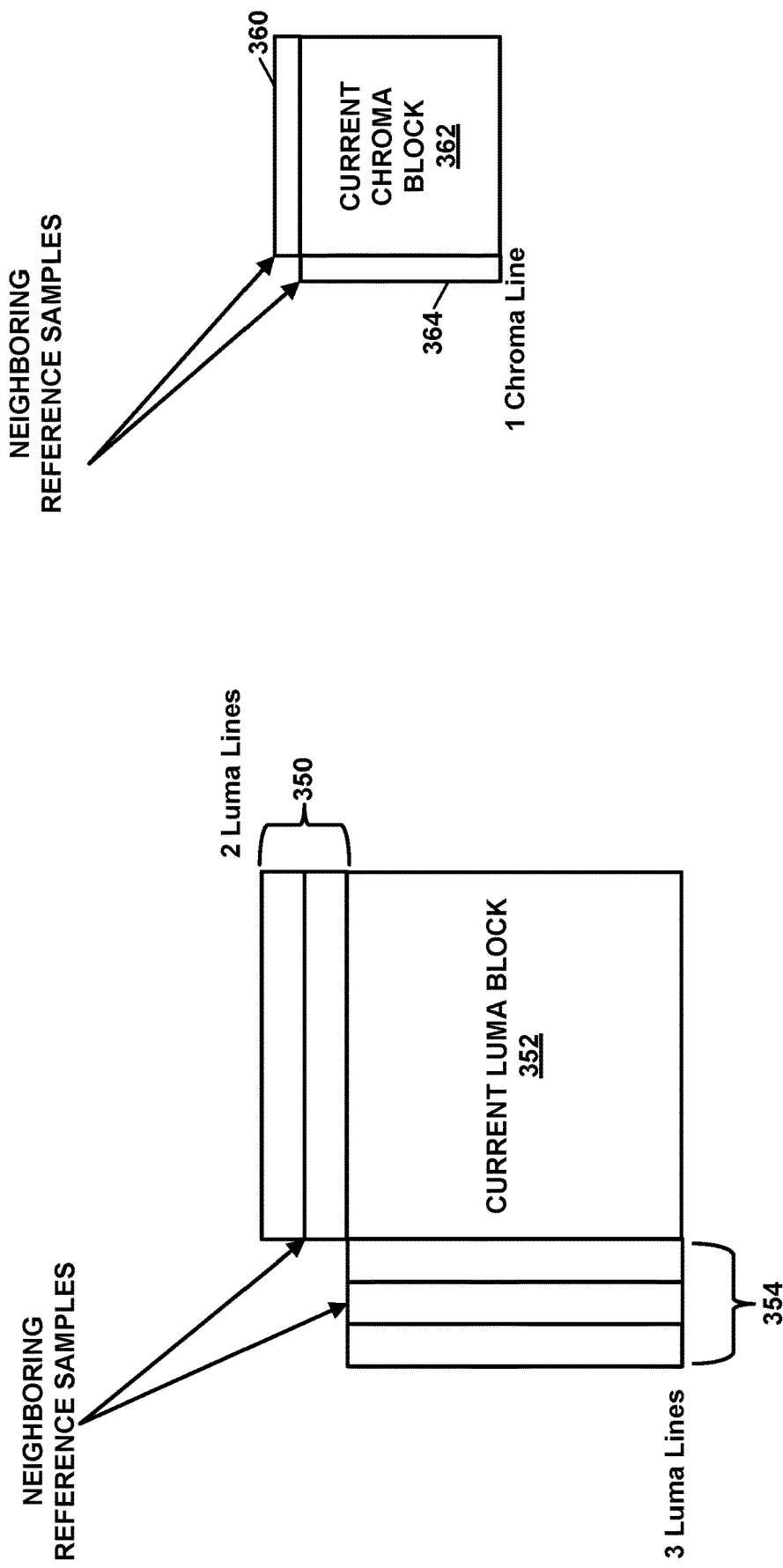
FIG. 4 is a block diagram that illustrates an example of the neighborhood of reference samples that a video encoder and/or video decoder of this disclosure may use for cross-component linear model (CCLM) mode and/or multi-model linear model (MMLM) mode.

In accordance with the techniques of this disclosure, video encoder 200 and video decoder 300 may be configured to perform multi-direction linear prediction mode (MDLM). According to cross-component linear model (CCLM) mode, video encoder 200 and video decoder 300 may estimate parameters of prediction models based on reference samples (luma and chroma) that belong to neighboring blocks. FIG. 4 is a block diagram that illustrates an example of the neighborhood of reference samples that video encoder 200 and video decoder 300 may use for CCLM and/or MMLM coding. In the example of FIG. 4, video encoder 200 and video decoder 300 may use two luma rows 350 from above a current luma block 352 and three luma columns 354 from the left of current luma block 352. In the example of FIG. 4, one chroma row 360 above a current chroma block 362 and one chroma column 364 positioned to the left of the current chroma block 362 are also used in the derivation. Video encoder 200 and video decoder 300 may down-sample the luma samples in rows 350 and columns 354. By down-sampling the luma samples in rows 350 and columns 354, video encoder 200 and video decoder 300 may determine a luma value corresponding to each chroma sample of chroma row 360 and chroma column 364.

When the rows or columns of luma reference samples cross CTU boundaries, additional restrictions may be applicable on the number of reference lines used. For instance, if the upper row of rows 350 is in a different CTU than current luma block 352, video encoder 200 and video decoder 300 may not use the upper row of luma rows 350 to estimate parameters of the prediction models.

Figure 5:
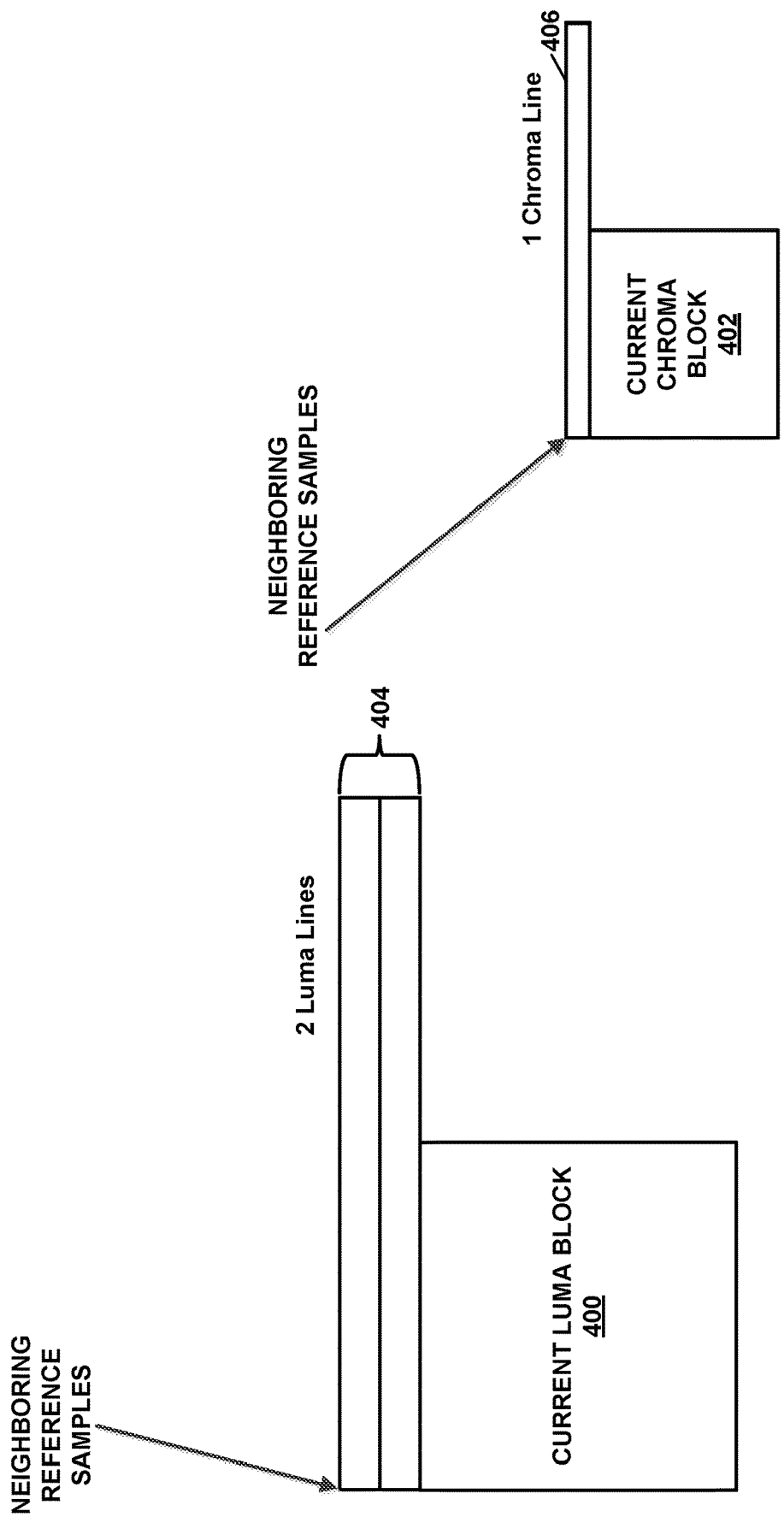
FIG. 5 is a block diagram illustrating example sets of reference samples that may be used for deriving the CCLM parameters.

FIG. 5 is a block diagram illustrating example sets of reference samples that may be used for deriving the CCLM parameters. In the example of FIG. 5, a current luma block 400 and a current chroma block 402 correspond to a same area within a picture. Furthermore, in the example of FIG. 5, video encoder 200 and video decoder 300 only use luma samples in rows 404 above current luma block 400 and a row 406 above current chroma block 402 to determine parameters of one or more linear models for prediction of chroma samples in current chroma block 402.

Figure 6:
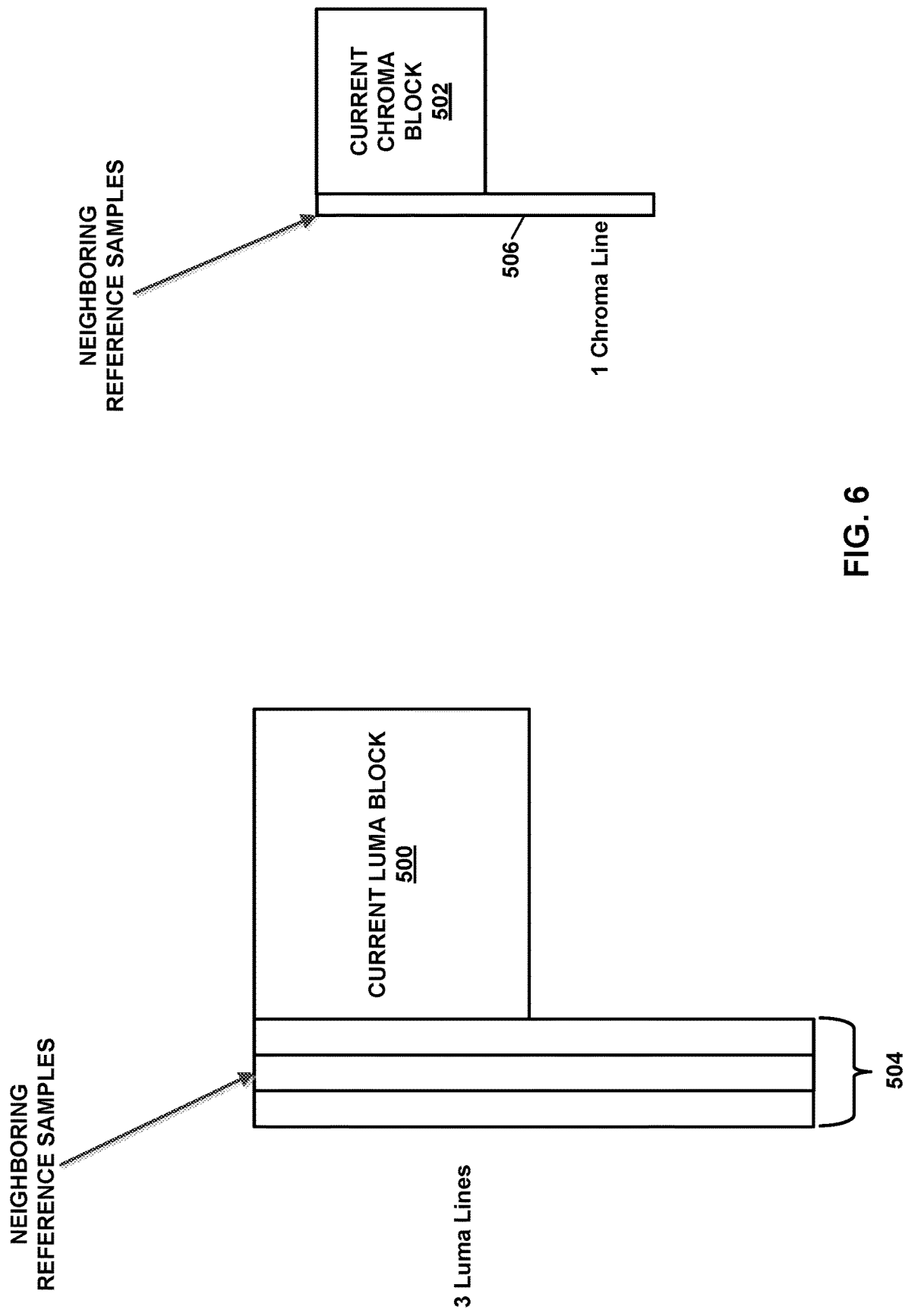
FIG. 6 is a block diagram illustrating a different example of sets of reference samples that may be used for deriving the CCLM parameters. FIGS.

FIG. 6 is a block diagram illustrating a different example of sets of reference samples that may be used for deriving the CCLM parameters. In the example of FIG. 6, a current luma block 500 and a current chroma block 502 correspond to a same area within a picture. Furthermore, in the example of FIG. 6, video encoder 200 and video decoder 300 only use luma samples in columns 504 left of current luma block 500 and a column 506 left of current chroma block 502 to determine parameters of one or more linear models for prediction of chroma samples in current chroma block 502.

In either the example of FIG. 5 or the example of FIG. 6, video encoder 200 may signal the particular set of reference samples to be chosen for the parameter estimation to video decoder 300 in the bitstream. For example, video encoder 200 may signal in the bitstream whether rows 404 and row 406 or columns 504 and column 506 are used to determine parameters of one or more linear models for prediction of chroma samples in a current chroma block. This signaling enables video decoder 300 to perform CCLM prediction.

There may be one or more potential issues/shortcomings with the current design of CCLM and MDLM. Some of these potential issues/shortcomings are described below. For instance, one issue associated with the current design of CCLM and MDLM is that when more than one prediction model is used for luma-to-chroma prediction, video encoder 200 and video decoder 300 have to derive the parameters of each prediction model. Using the min-max approach to parameter estimation, video encoder 200 and video decoder 300 may have to generate the minimum and maximum luma values for each class/group, and this could result in multiple passes/accesses of the reference samples. Multiple passes/accesses could involve fetching from buffers/memory that could introduce latency to the decoding process (e.g., as implemented by video decoder 300 or by a decoding loop of video encoder 200). A reduction in the number of passes of the reference samples in the parameter derivation could provide a potential improvement in efficiency of video encoder 200 and/or video decoder 300.

In another example of an issue associated with the current design of CCLM and MDLM, the down-sampling operation of the luma samples (based on the chroma format) is performed to collocate luma and chroma samples to improve prediction accuracy. In other words, there may be fewer chroma samples than luma samples and not all of the chroma samples may correspond to locations of luma samples, so video encoder 200 and video decoder 300 may down-sample the luma samples of a block so that there is a luma sample for each of the chroma samples. In this context, down-sampling the luma samples may involve applying an average or filter to luma samples to determine luma samples that correspond to the chroma samples. However, the down-sampling operation also introduces latency in the decoding process (e.g., as implemented by video decoder 300 or by a decoding loop of video encoder 200).

In still another example of an issue associated with the current design of CCLM and MDLM, the prediction phase of CCLM and MMLM involves multiplying the parameter a with a down-sampled luma value for each chroma sample in the block. Although the multiplication operation is simpler than division from a computational complexity standpoint, the multiplication operation still requires more computations than specific other types of operations, such as additions, subtractions, and shifts. Because a CCLM/MMLM module or unit in a decoder (e.g., video decoder 300 or a decoding loop of video encoder 200) is most likely in a critical path of execution, any additional computations performed by the CCLM/MMLM module or unit may increase the latency of the encoding or decoding process.

In another example of an issue associated with the current design of CCLM and MDLM, when more than one linear model can be used, video encoder 200 has to signal in the bitstream whether a single model is used or multiple models are used. For example, single-model CCLM and MMLM may be two different modes that are usable for intra coding of chroma samples. The need to signal to video decoder 300 indication(s) of whether a single linear model is used or multiple linear models are used may result in more bits being needed to indicate the linear model(s) that is or are used.

This disclosure describes various techniques that may address one or more of the potential problems listed above. In various examples, the techniques described in this disclosure may mitigate one or more of the potential issues, and in some examples, the techniques may eliminate one or more of the potential issues. The techniques of this disclosure may be implemented individually, or in some examples, various combinations of the techniques may be implemented, whether concurrently or in any serial sequence.

According to some examples in accordance with this disclosure, video encoder 200 and/or video decoder 300 may derive a luma value (referred to as "boundary value" or "boundary luma value") to classify samples into multiple classes. Video encoder 200 and/or video decoder 300 may base the derivation of the boundary value on one or more criteria. The criteria include, but are not limited to, the examples listed below:
a. reducing the prediction error of the models;
b. ensuring that the prediction process is simple with minimal impact on latency; and
c. reducing adverse effects on the visual quality of the coded video.

In some examples, video encoder 200 and/or video decoder 300 may derive the boundary value as an average of the luma values of the down-sampled luma reference samples for a current block. Using the boundary value (e.g., as a threshold), video encoder 200 and/or video decoder 300 may classify the reference samples into two classes. Video encoder 200 and/or video decoder 300 may estimate the linear model parameters for each class.

In some examples where video encoder 200 and/or video decoder 300 derive the boundary luma value as an average of the luma values of the down-sampled luma reference samples, video encoder 200 and/or video decoder 300 may derive a minimum luma value minY (and a corresponding minC chroma value or the chroma value collocated with the minY luma value) and a maximum value maxY (and a corresponding maxC chroma value or the chroma value collocated with the maxY luma value) for each class. Video encoder 200 and/or video decoder 300 may then use these values to derive the parameters of the model. In some examples, video encoder 200 and/or video decoder 300 may estimate parameters of each class based on a least-mean-square method to reduce the prediction error.

Thus, in some examples, video encoder 200 and video decoder 300 may derive a luma value associated with a block and may classify samples of the block into two or more classes based on the derived luma value. Video encoder 200 and video decoder 300 may estimate parameters separately for each respective class of the two or more classes of samples. In some such examples, video encoder 200 and video decoder 300 may derive a respective minimum luma value and a respective maximum luma value for each respective class of the two or more classes of samples. Video encoder 200 and/or video decoder 300 may derive the respective parameters for each class based on the corresponding respective minimum luma value and corresponding respective maximum luma value for each class. Furthermore, in some examples, video encoder 200 and video decoder 300 may derive a corresponding minimum chroma value for each respective minimum luma value and may derive a corresponding maximum chroma value for each respective maximum luma value. In some examples, video encoder 200 and video decoder 300 may derive a respective collocated minimum chroma value for each respective minimum luma value and may derive a respective collocated maximum chroma value for each respective maximum luma value. In some examples, video encoder 200 and video decoder 300 may estimate the parameters using a least means square method.

According to some examples in accordance with this disclosure, video encoder 200 and/or video decoder 300 may derive the model parameters using the left and top neighboring samples of the current block as the reference samples (e.g., as shown in the examples of FIG. 4, FIG. 5, and FIG. 6). In one example, video encoder 200 and/or video decoder 300 may use the left neighboring samples (e.g., as shown in the example of FIG. 6). In another example, video encoder 200 and/or video decoder 300 may use the top neighboring samples (e.g., as shown in the example of FIG. 5). In yet another example, video encoder 200 and/or video decoder 300 may use the left and top neighboring samples (e.g., as shown in the example of FIG. 4), or use the left samples, or use the top samples. For instance, video encoder 200 may signal the selection of neighboring samples to video decoder 300. Alternatively, the selection of neighboring samples can be derived based on current block dimensions, or data from neighboring blocks such as the selected neighboring samples, intra modes. Alternatively, the selection of neighboring samples can be determined by first determining the best selection of neighboring samples with a single model for luma to chroma derivation.

Thus, in some examples, video encoder 200 and video decoder 300 may derive model parameters for a current block of the video data using one or both of left neighboring samples of the current block or top neighboring samples of the current block. In some such examples, video encoder 200 and video decoder 300 may select a subset of one or both of the left neighboring samples or the top neighboring samples based on one or more of dimensions associated with the current block or data associated with one or more neighboring blocks of the current block. In some such examples, video encoder 200 and video decoder 300 may select a subset of one or both of the left neighboring samples or the top neighboring samples based on neighboring sample selection for a single model for luma-to-chroma derivation.

According to some examples in accordance with this disclosure, video encoder 200 and/or video decoder 300 may also use the luma boundary value in the parameter estimation process. Using the luma boundary value in the parameter estimation process may reduce the computations needed to be performed by video encoder 200 and/or video decoder 300 for deriving the respective model parameters, and thus potentially reduce the latency. When a corresponding chroma value is available for the boundary value, video encoder 200 and/or video decoder 300 may use the corresponding chroma value in the parameter estimation. When a corresponding chroma value is not available, video encoder 200 and/or video decoder 300 may derive a representative chroma value to be used in the parameter estimation. Thus, in some such examples, video encoder 200 and video decoder 300 may derive a luma value associated with a current block of the video data and estimate model parameters for the current block based on the derived luma value and a chroma value. In some such examples, video encoder 200 and video decoder 300 may obtain the chroma value using a corresponding chroma value associated with the derived luma value; or determine that no corresponding chroma value associated with the luma value is available and obtain the chroma value using a representative chroma value.

For instance, in one example where video encoder 200 and video decoder 300 uses the luma boundary value in the parameter estimation process, video encoder 200 and/or video decoder 300 may derive a boundary luma value and a chroma value to be used in the parameter estimation process. For example, let minY be the minimum luma value among the reference samples, and let minC be the chroma value corresponding to the minY value or the chroma value collocated with the minY value. Similarly, let maxY be the maximum luma value among the reference samples and let maxC be the corresponding chroma value or the chroma value collocated with the maxY value. Let avgY and avgC be the average (mean) luma and chroma values of the luma and chroma reference samples, respectively. Video encoder 200 and/or video decoder 300 may then use (minY, minC) and (avgY, avgC) for deriving the parameters for the first linear model, and (avgY, avgC) and may use (maxY, maxC) to derive the parameters for the second linear model. In this case, avgY may also be used as the boundary luma value. In this example, only one pass/access of the luma reference samples is needed because video encoder 200 and video decoder 300 may compute avgY, minY and maxY together. When a min-max-like approach is used for the parameter estimation process, video encoder 200 and/or video decoder 300 may derive the linear model parameters ($\alpha 1$, $\beta 1$ for the first linear model and $\alpha 2$, $\beta 2$ for the second linear model) as follows:

$$\alpha 1 = (avgC - minC)/(avgY - minY),$$

$$\beta 1 = minC - \alpha 1 * minY$$

$$\alpha 2 = (avgC - maxC)/(avgY - maxY),$$

$$\beta 2 = maxC - \alpha 2 * maxY$$

Thus, in this example, video encoder 200 and video decoder 300 may derive a luma value associated with a current block of the video data and estimate model parameters for the current block based on the derived luma value and a chroma value. In this example, video encoder 200 and video decoder 300 may derive the luma value using a mean luma value and may derive the chroma value as a mean chroma value. In some such examples, video encoder 200 and video decoder 300 may use syntax elements associated with one or more neighboring blocks of the current block to derive the mean luma value and the mean chroma value.

In another example where video encoder 200 and video decoder 300 use the luma boundary value in the parameter estimation process, video encoder 200 and video decoder 300 may derive a boundary luma value and a chroma value to be used in the parameter estimation process. For example, let minY be the minimum luma value among the reference samples, and minC be the chroma value corresponding to the minY value, or the chroma value collocated with the minY value. Similarly, let maxY be the maximum luma value among the reference samples and let maxC be the corresponding chroma value or the chroma value collocated with the maxY value. Let medY and medC be the median luma and chroma values of the luma and chroma reference samples, respectively, or let medC be the chroma value collocated with the medY luma value. Video encoder 200 and video decoder 300 may then use (minY, minC) and (medY, medC) for deriving the parameters for the first linear model and may use (medY, medC) and (maxY, maxC) to derive the parameters for the second linear model, e.g., using the following equations:

$$\alpha 1 = (medC - minC)/(medY - minY),$$

$$\beta 1 = minC - \alpha 1 * minY$$

$$\alpha 2 = (medC - maxC)/(medY - maxY),$$

$$\beta 2 = maxC - \alpha 2 * maxY$$

Thus, in this example, video encoder 200 and video decoder 300 may derive a luma value associated with a current block of the video data and estimate model parameters for the current block based on the derived luma value and a chroma value. In this example, video encoder 200 and video decoder 300 may derive the luma value using a median luma value and may derive the chroma value as a median chroma value.

In another example where video encoder 200 and video decoder 300 uses the luma boundary value in the parameter estimation process, video encoder 200 and/or video decoder 300 may use an n-th percentile luma reference sample or a fixed luma value as the boundary luma value. In some instances, chroma sample values corresponding to higher luma sample values may need more accurate representation than those corresponding to lower luma sample values. As such, video encoder 200 may signal the n-th percentile or the fixed luma value in the bitstream, as derived by video encoder 200, or as predetermined. In this example, video encoder 200 and video decoder 300 may use the n-th percentile luma and chroma reference values in the same way as medY and medC in the previous example.

Thus, in this example, video encoder 200 and video decoder 300 may derive a luma value associated with a current block of the video data and estimate model parameters for the current block based on the derived luma value and a chroma value. In this example, video encoder 200 and video decoder 300 may derive the luma value by setting an n-th percentile luma reference sample as the luma value. Alternatively, in this example, video encoder 200 and video decoder 300 may derive the luma value by setting a fixed luma reference sample as the luma value.

According to some examples in accordance with this disclosure, video encoder 200 and/or video decoder 300 may derive the average values of the luma and chroma components from syntax elements or other characteristics of neighboring blocks. For instance, video encoder 200 and video decoder 300 may derive a mean luma value and a mean chroma value using syntax elements associated with one or more neighboring blocks of the current block. Video encoder 200 and/or video decoder 300 may derive the average (e.g., mean) luma value by taking a weighted average (e.g. a weighted mean value) of the top reference samples (e.g., reference samples in rows above the current block) and the average (e.g. mean) value of the left reference samples (e.g., reference samples in columns left of the current block). For example, video encoder 200 and/or video decoder 300 may approximate the average (e.g., mean) luma value of the top reference samples based on the DC value of one of the top reference blocks. In other words, video encoder 200 and video decoder 300 may approximate the average luma value of reference samples above the current block based on a DC value of a block above the current block. Video encoder 200 and video decoder 300 may approximate the average (e.g., mean) value for the left reference block in a similar way. The DC value may be obtained from the transform coefficients or by other means. For instance, video encoder 200 may determine a block of transform coefficients for a reference block (i.e., a block above or left of the current block) by applying a transform to residual samples of the block and quantizing the transform coefficients. The DC value may be derived from the top-left transform coefficient of the block of transform coefficients for the reference block. The top-left transform coefficient may represent an average value of the residual of the reference block which may be used in addition to the predicted samples of the reference block to determine the DC value. Video encoder 200 may signal the quantized transform coefficients in a bitstream. Video decoder 300 may inverse quantize the quantized transform coefficients and derive the DC value of the reference block.

According to some examples of this disclosure, video encoder 200 and video decoder 300 may skip the down-sampling operation of the luma values. In other words, video encoder 200 and video decoder 300 may skip down-sampling operations with respect to a luma value that is used to estimate model parameters for the current block. For instance, video encoder 200 and video decoder 300 may derive the luma values (e.g., maximum luma, minimum luma, average (mean) luma, median luma, etc.) used for the derivation of the model parameters (e.g., $\alpha_1$, $\beta_1$, $\alpha_2$, $\beta_2$) from all the reference samples without down-sampling. When the video has content that has subsampled chroma values, multiple luma values may have one corresponding chroma value; e.g., for 4:2:0 content chroma samples are subsampled and four luma samples correspond to one chroma sample (of each component), and this chroma sample may be chosen as the corresponding chroma sample for each of the four luma samples. The location of the chroma sample depends on the sampling location type which may be indicated in the bitstream (using a parameter in video usability information (VUI)).

Furthermore, according to some examples in accordance with this disclosure, video encoder 200 may skip separate signaling of the neighborhood, and all the reference samples (e.g., twice the width and twice the height of the current block) are used for the parameter estimation. In other words, rather than signal whether to use rows above the current block, columns left of the current block, or both rows above the current block and columns left of the current block in the parameter estimation process, along with the number of rows and/or columns, video encoder 200 and video decoder 300 may directly determine that the number of rows and/or columns based on the width and/or height of the current block. Thus, in some such examples, video encoder 200 and video decoder 300 may use all reference samples in a neighborhood that has twice a height and twice a width of the current block to derive a luma value that is used to estimate model parameters for the current block. Furthermore, in some such examples, video encoder 200 and video decoder 300 may skip separate signaling of any syntax elements or indicators that specify which reference samples in the neighborhood of the current block.

Some examples in accordance with this disclosure involve determining a set of possible values for the $\alpha$ and $\beta$ parameters for the model derivation. According to these examples, the values of the $\alpha$ and $\beta$ parameters may be constrained to be contained in a set of values. For instance, in some such examples, the value of the $\alpha$ parameter may be restricted such that the operation of multiplication with the $\alpha$ parameter be performed with shift operations and, in some cases, additions (e.g., values of $\alpha$ restricted to values such as 1, 2, 4, . . . , 0.5, 0.25, 0.375, etc.). Such a restriction may be explicitly imposed (e.g., by stating that the values of the $\alpha$ parameter must be of certain values in a table) or by replacing the usage of a values by a set of shift and addition operations. Thus, in some examples, video encoder 200 and/or video decoder 300 may determine a set of a parameters and a set of β parameters for model derivation with respect to samples of a current block, wherein determining the set of α parameters and the set of β parameters comprises constraining each of the set of α parameters and the set of β parameters to be contained within a respective set of values. In some such examples, video encoder 200 and/or video decoder 300 may constrain the α parameters such that multiplication of the α parameters is performed with shift operations. In some such examples, video encoder 200 and/or video decoder 300 may constrain the set of α parameters such that multiplication of the α parameters is performed with shift operations and addition operations.

According to some examples in accordance with this disclosure, video encoder 200 and/or video decoder 300 may determine whether one or whether two linear models are to be used for luma to chroma derivation based on luma and chroma reference samples. In this example, a difference between a first derived value of the luma reference samples (e.g., minimum of the reference luma sample values) and a second derived value of the luma reference samples (e.g., maximum of the reference luma sample values) is computed and the difference is compared with a threshold value (e.g., 512 for 10-bit luma samples). In one example, two linear models are used if the difference is greater than the threshold. Otherwise (e.g., if the difference is less than or equal to the threshold), one linear model is used.

In another example, video encoder 200 and video decoder 300 may determine whether one or whether two linear models are to be used for luma to chroma derivation based on luma and chroma reference samples. In this example, video encoder 200 and/or video decoder 300 may compare a first value derived from the luma reference samples with a first threshold and compare a second value derived from the luma reference samples with a second threshold. For example, the first value may be the minimum of the luma reference sample values, and the second value may be the maximum of the luma reference sample values. For example, if the first value is smaller than the first threshold value (e.g., 0.8×512 for 10-bit luma samples) and the second value is greater than the second threshold value (e.g., 1.2×512 for 10-bit luma samples), then two linear models are used. Otherwise, one linear model is used.

In some examples, video encoder 200 and video decoder 300 may determine whether one or whether two linear models are to be used for luma to chroma derivation based on block size. For instance, in this example, for blocks with a number of samples less than a value N, video encoder 200 and/or video decoder 300 may be constrained to use one linear model (or constrained not to use two linear models), and for blocks with number of samples greater than equal to N, video encoder 200 and/or video decoder 300 may be constrained to use two linear models (or constrained not to use one linear model). The value of N, or a value that is used to derive N, may be fixed, or video encoder 200 may signal the value of N in the bitstream. In one example, more than one type of linear model may be disabled based on the block size, e.g., for blocks sizes with less than five (5) chroma samples, both single-model and two-model CCLM may be prohibited. In some examples, the size of the block may also be expressed in terms of block height, block width, or a combination of the block's height and width (e.g., a sum thereof, a product thereof, etc.).

In some examples, video encoder 200 and video decoder 300 may determine whether one or whether two linear models are to be used for luma to chroma derivation based on whether intra prediction (luma and chroma) is used by one or more neighboring blocks. For instance, video encoder 200 and video decoder 300 may determine that one linear model is used when one or more of the neighboring blocks use intra prediction and may determine that two linear models are used when none of the neighboring blocks use intra prediction. In another example, video encoder 200 and video decoder 300 may determine that two linear models are used when one or more of the neighboring blocks use intra prediction and may determine that one linear model is used when none of the neighboring blocks use intra prediction.

In some examples, video encoder 200 and video decoder 300 may determine whether one or whether two linear models are to be used for luma to chroma derivation based on the number of linear models used by one or more neighboring blocks. For instance, in some examples, when one or more neighboring blocks use(s) luma-to-chroma prediction with multiple linear models, it may be likely that the current block can also benefit by using multiple linear models. In some examples of this disclosure, video encoder 200 and/or video decoder 300 may select a certain number of neighboring blocks of the current block and compare a count of such blocks that use one linear model with a count of blocks that use two linear models. If more (e.g., a greater number of) neighboring blocks use only one linear model, then the current block may also be constrained to use one linear model (or constrained not to use two linear models). If more (e.g., a greater number of) neighboring blocks use two linear models, then the current block may also be constrained to use two linear models (or constrained not to use one linear model). In some examples, video encoder 200 and/or video decoder 300 may also use other conditions to determine the number of linear models to be used for the current block.

Thus, video encoder 200 and/or video decoder 300 may determine whether a single model or multiple linear models are to be used for luma-to-chroma derivation with respect to a current block of the video data, wherein the determination is based on one or more of (i) a comparison between a first derived value of luma reference samples to a threshold value, (ii) a size of the current block, (iii) an intra mode used to code one or more neighboring blocks of the current block, or (iv) a number of models used for luma-to-chroma derivation for one or more neighboring blocks of the current block.

In some examples, different intra prediction modes may be used for corresponding luma and chroma blocks. The intra prediction modes used for a chroma block may include directional intra prediction modes, DC mode, planar mode, an LM mode with a signal linear model, and a LM mode with two linear models. When a subset of the chroma modes (i.e., intra prediction modes used for chroma blocks) are constrained to be not used for a current block (e.g., the current block is constrained to not use a LM model with two linear models), video encoder 200 may exclude the chroma modes that are related to the LM mode with two linear models from signaling. This exclusion may involve not including the respective chroma modes in any lists used to indicate allowed chroma modes, or disabling signaling of the chroma mode in the syntax, or constraining syntax elements in the bitstream to ensure that video encoder 200 is not allowed to indicate the respective chroma modes. For instance, instead of signaling an index of a chroma mode for the current block as a value in a range of 0 to N (where N indicates the number of chroma modes), video encoder 200 may signal to index as a value in a range of 0 to N−1. This may reduce the number of bits used to signal the index. In such cases, based on the conditions of exclusion, video decoder 300 may also determine that the respective chroma modes are excluded, and may refrain from including certain chroma modes in mode lists or refrain from parsing some syntax elements (e.g. certain syntax elements).

In some examples in accordance with this disclosure, as an alternative to deriving a boundary value, the current block can be divided into regions, and for each resulting region, video encoder 200 and/or video decoder 300 may derive a linear model from neighboring reference sample values.

For instance, in some examples where the current block is divided into regions and linear models are derived for each resulting region, the current block may be divided into four quarters of equal size, and a first model is used for luma to chroma prediction of the top-left, top-right and bottom-left quarters, while a second model is used for luma to chroma prediction of the bottom-right quarter. In one instance, the first model parameters are derived from the left and top neighboring reference samples of the current block, and the second model parameters are derived from extended left and extended top neighboring samples of the current block. The extended left neighboring samples may be in one or more columns left of the current block and below a bottom row of the current block. The extended top neighboring samples may be in one or more rows above the current block and right of a rightmost column of the current block.

In another example where the current block is divided into regions and models are derived for each resulting region, the current block is divided into four quarters of equal size. A first model is used for luma to chroma prediction of the top-left quarter. A second model is used for luma to chroma prediction of the top-right quarter. A third model is used for luma to chroma prediction of the bottom-left quarter. A fourth model is used for luma to chroma prediction of the bottom-right quarter. The first model parameters are derived from the left and top neighboring reference samples of the first quarter. The second model parameters are derived from the top neighboring samples of the second quarter. The third model parameters are derived from the left neighboring samples of the third quarter. The fourth model parameters are derived from the extended left and extended top neighboring samples of the current block.

In one example where the current block is divided into regions and models are derived for each resulting region, the division of a block into regions may depend on the block size or other characteristics of the samples. Video encoder 200 may signal the division (e.g., data describing the division scheme) in the bitstream or, may be pre-determined by video encoder 200 and/or video decoder 300. For instance, for block sizes of 32×32, the block may be divided into 16 regions of 8×8 blocks, and for block sizes of 8×8, the block may be divided into four regions of 4×4 blocks. The regions may be rectangular (including square, but not necessarily square) or any other shape that may be better representative of the classification of the samples. The indication of the regions may be done using offsets with respect to block boundaries or picture boundaries (e.g. top, left, bottom, and right offsets of the four boundaries of the region with respect to the top, left, bottom, and right boundaries of the current block). In some examples, other partitioning structures and associated signaling may be used to define the regions.

Although the description above discusses two-model prediction systems, it will be understood that one or more techniques or system configurations described above may also be applicable or extended to prediction systems with more than two models or that accommodate more than two models (e.g., MMLM with three models).

Additionally, the reference to chroma in the description above typically refers to chroma samples of a particular chroma component (e.g., Cb) and it will be understood that one or more techniques or system configurations described above may be applicable also to the samples of the other chroma component (e.g., Cr). Moreover, explicit or implicit dependencies on block sizes, intra modes of the current block, and one or more neighboring blocks may be applicable in one or more of the above techniques/configurations, and are not explicitly detailed in this disclosure. One or more techniques/configurations may also apply in cases where the three components are not Y, Cb and Cr, and one or more components are predicted from another component (e.g., red and blue components may be predicted from the green component in RGB format). Thus, in some examples, video encoder 200 and/or video decoder 300 may identify four non-overlapping regions of a current block of the video data. In this example, video encoder 200 and/or video decoder 300 may determine a model with respect to luma-to-chroma derivation for each respective region of the four non-overlapping regions of the current block.

Figure 7:
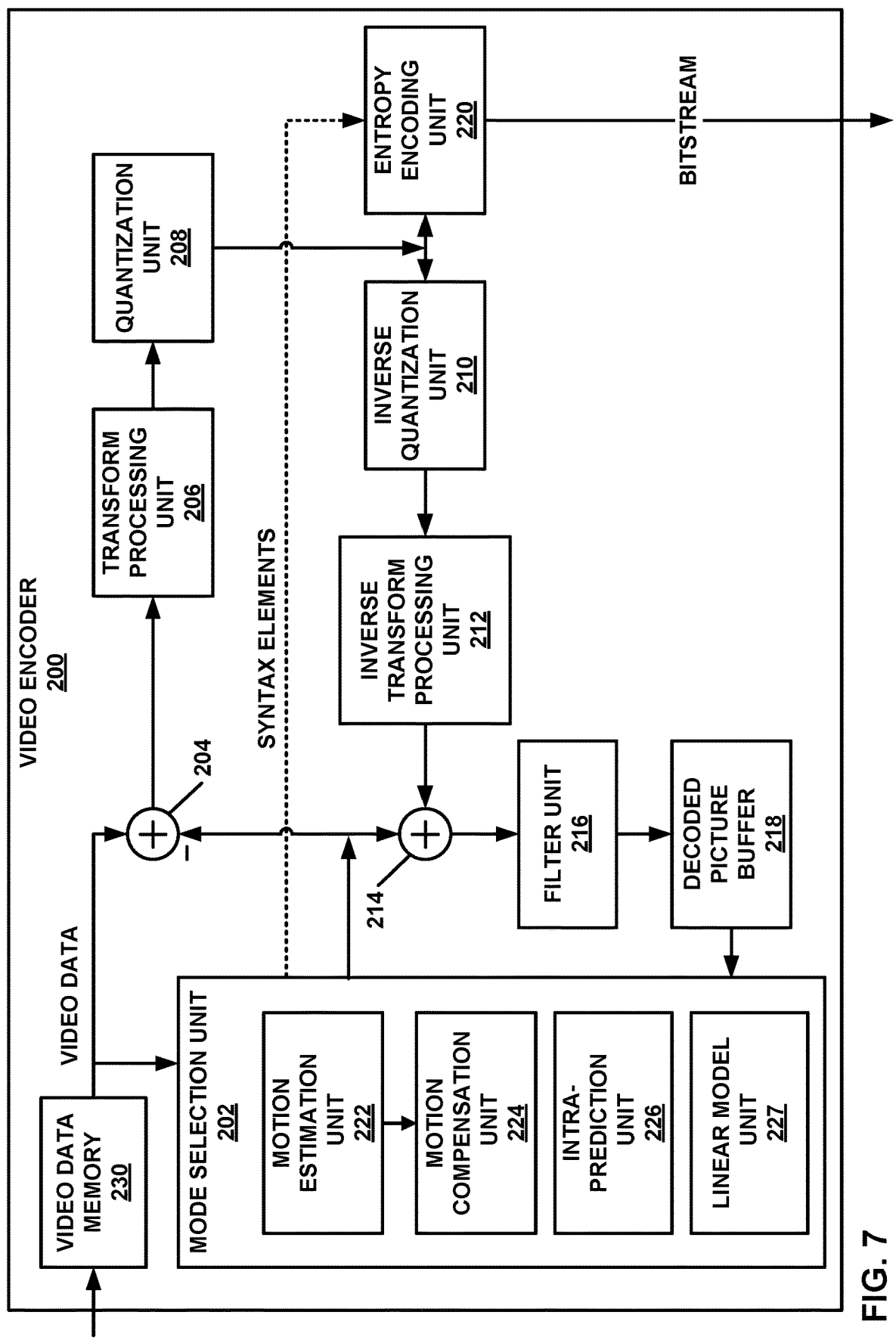
FIG. 7 is a block diagram illustrating an example video encoder that may perform the techniques of this disclosure.

FIG. 7 is a block diagram illustrating an example video encoder 200 that may perform the techniques of this disclosure. FIG. 7 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 7, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions. Non-limiting examples of processing circuitry that video encoder 200 may include are fixed function circuitry, programmable circuitry, and ASICs.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 7 are illustrated to assist with understanding the operations performed by video encoder 200. The units may be implemented as fixed-function circuits, programmable circuits, ASICs, FPGAs, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, an intra-prediction unit 226, and a linear model (LM) unit 227. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that define the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

In examples where a current block is encoded using LM prediction, mode selection unit 202 may generate values of luma samples of a prediction block for the current block. For instance, motion compensation unit 224 or intra-prediction unit 226 may generate values of luma samples of the prediction block for the current block. Residual generation unit 204 may generate luma samples of a residual block for the current block based on values of luma samples of the current block and the values of the luma samples of the prediction block for the current block. Transform processing unit 206 may apply a transform to the luma samples of the residual block to generate transform coefficients, quantization unit 208 may quantize the transform coefficients, inverse quantization unit 210 may inverse quantize the quantized transform coefficients, and inverse transform processing unit 212 may apply an inverse transform to the inverse-quantized quantized transform coefficients to reconstruct the luma samples of the residual block for the current block. Reconstruction unit 214 may reconstruct the values of the luma samples of the current block based on the values of the luma samples of the prediction block for the current block and the values of luma samples of the residual block for the current block. In some examples, filter unit 216 may apply one or more filters to the reconstructed values of the luma samples of the current block. LM unit 227 may use the reconstructed (and in some examples, filtered and/or down-sampled) luma samples of the current block, which may be denoted as $rec_L'(i, j)$, to determine predicted chroma samples of the current block (e.g., using equation (2)).

In accordance with one or more techniques of this disclosure, LM unit 227 may determine a boundary luma value; derive a chroma value that corresponds to the boundary luma value; derive a first prediction model and a second prediction model based on the derived chroma value; use the first prediction model to determine a first set of predicted chroma samples of a prediction block for the current block, the first set of predicted chroma samples corresponding to the luma samples of the prediction block that have values less than or equal to the boundary luma value; and use the second prediction model to determine a second set of predicted chroma samples of the prediction block, the second set of predicted chroma samples corresponding to the luma samples of the prediction block that have values greater than the boundary luma value. These actions are described in greater detail elsewhere in this disclosure. In general, residual generation unit 204, transform processing unit 206, quantization unit 208, inverse quantization unit 210, inverse transform processing unit 212, reconstruction unit 214, and filter unit 216 may handle the predicted chroma samples of the prediction block of the current block in the same way as the luma samples of the prediction block of the current block.

In the example of FIG. 7, video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device for encoding video data including a memory configured to store video data, and one or more processing units implemented in processing circuitry and configured to perform example techniques described in this disclosure. For example, the processing circuitry of video encoder 200 (e.g., processing circuitry of LM unit 227) may be configured to determine a boundary luma value. Samples having values less than or equal to the boundary luma value are classified as a first group and samples having values greater than the boundary luma value are classified as a second group. The processing circuitry of video encoder 200 (e.g., processing circuitry of LM unit 227) may be configured to determine first set of predicted samples of a predicted block for samples of the first group based on a first prediction model having a first parameter and a second parameter, and determine second set of predicted samples of the predicted block for samples of the second group based on a second prediction model having a third parameter and a fourth parameter.

For example, the first model is $\alpha1*Rec_L'[x,y]+\beta1$ if $Rec_L'[x,y] \leq Threshold$. In this example, the first set of predicted samples of the predicted block are those generated from the first model. The first parameter is $\alpha1$, and the second parameter is $\beta1$. The second model is $\alpha2*Rec_L'[x,y]+\beta2$ if $Rec_L'[x,y] > Threshold$. In this example, the second set of predicted samples of the predicted block are those generated from the second model. The third parameter is $\alpha2$, and the fourth parameter is $\beta2$.

The processing circuitry of video encoder 200 (e.g., processing circuitry of LM unit 227) may be configured to determine at least one of the first parameter, second parameter, third parameter or fourth parameter. To determine at least one of the first, second, third, or fourth parameter, the processing circuitry may be configured to determine a first luma sample in the first group having a largest luma value among samples in the first group, determine a first chroma sample corresponding to the first luma sample, determine a second luma sample in the second group having a smallest luma value among samples in the second group, determine a second chroma sample corresponding to the second luma sample, and determine at least one of the first parameter, second parameter, third parameter, or fourth parameter based on the first chroma sample and the second chroma sample.

The processing circuitry of video encoder 200 (e.g., processing circuitry of residual generation unit 204) may be configured to determine a residual block between the predicted block and a current block. The processing circuitry of video encoder 200 (e.g., processing circuitry of entropy encoding unit 220) may signal information indicative of the residual block.

As one example, the processing circuitry of video encoder 200 (e.g., processing circuitry of LM unit 227) may determine a derived chroma value based on the first chroma sample and the second chroma sample. To determine at least one of the first parameter, second parameter, third parameter, or fourth parameter based on the first chroma sample and the second chroma sample, the processing circuitry of video encoder 200 (e.g., processing circuitry of LM unit 227) may be configured to determine at least one of the first parameter, second parameter, third parameter, or fourth parameter based on the derived chroma value. For instance, the processing circuitry of video encoder 200 (e.g., processing circuitry of LM unit 227) may determine an average of the first chroma sample and the second chroma sample to determine the derived chroma value.

To determine at least one of the first parameter, second parameter, third parameter, or fourth parameter based on the derived chroma value, the processing circuitry of video encoder 200 (e.g., processing circuitry of LM unit 227) may be configured to determine the first parameter ($\alpha 1$) as being equal to (c−Cy)/(Y1−Yb), determine the second parameter ($\beta 1$) as being equal to Cy−$\alpha 1$*Yb, determine the third parameter ($\alpha 2$) as being equal to (c−Cx)/(Y1−Ya), and determine the fourth parameter ($\beta 2$) as being equal to Cx−$\alpha 2$*Ya. In this example, c is equal to the derived chroma value, Cy is equal to second chroma sample, Y1 is equal to the boundary luma value, Yb is equal to the second luma sample, Cx is equal to first chroma sample, and Ya is equal to the first luma sample.

In some examples, the boundary luma value may be such that the predicted samples at the boundary luma value using the prediction models may be the same or within a threshold difference value. For instance, assume that a first predicted sample is equal to the first parameter multiplied by the boundary luma value plus the second parameter, and a second predicted sample is equal to the third parameter multiplied by the boundary luma value plus the fourth parameter. In this example, the boundary luma value is such that a difference (e.g., absolute value of the difference) between the first predicted sample and the second predicted sample is less than a threshold difference value. The threshold difference value may be approximately equal to 0 in some example.

Figure 8:
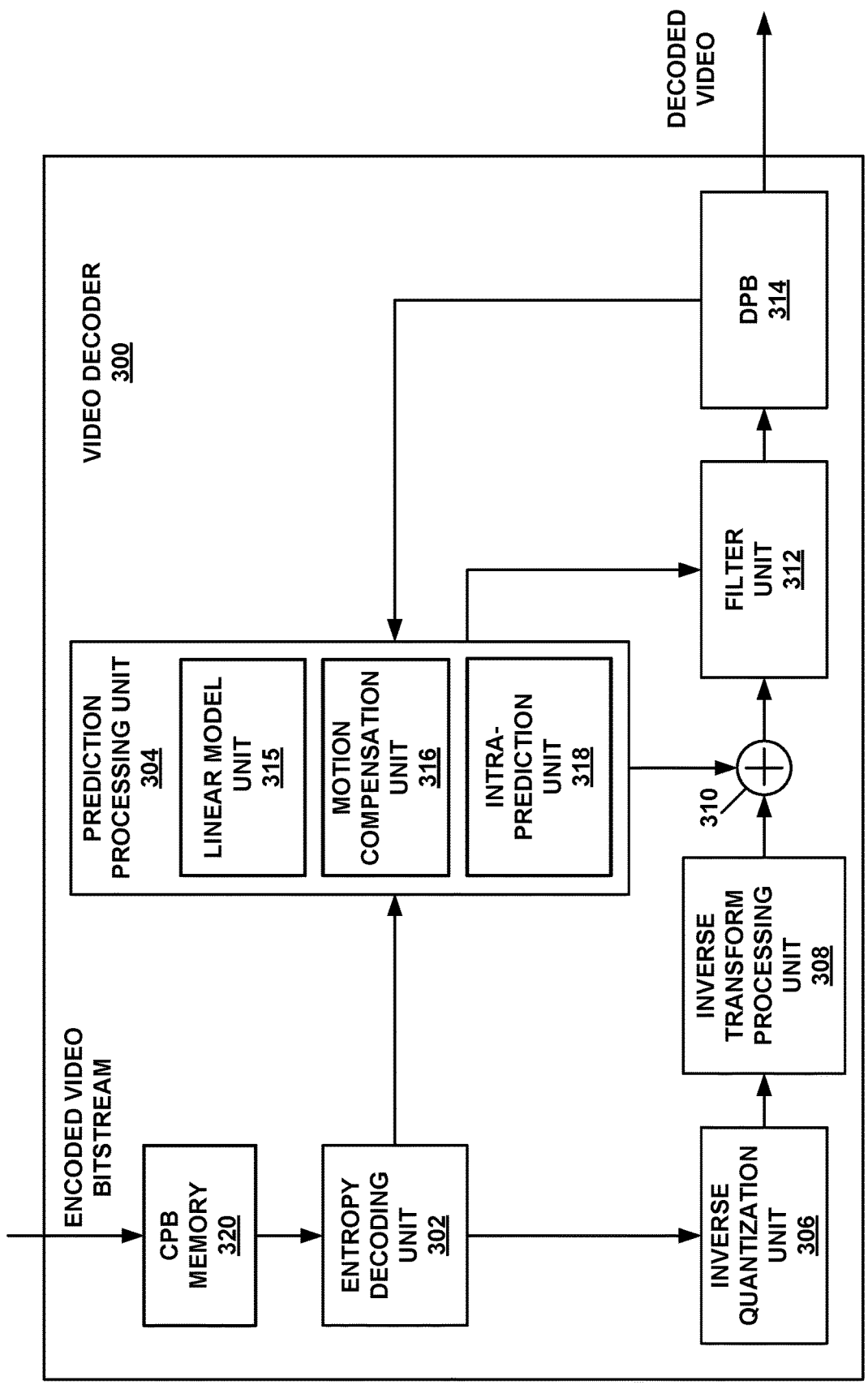
FIG. 8 is a block diagram illustrating an example video decoder that may perform the techniques of this disclosure.

FIG. 8 is a block diagram illustrating an example video decoder 300 that may perform the techniques of this disclosure. FIG. 8 is provided for purposes of explanation and is not limiting on the techniques as broadly exemplified and described in this disclosure. For purposes of explanation, this disclosure describes video decoder 300 according to the techniques of JEM and HEVC. However, the techniques of this disclosure may be performed by video coding devices that are configured to other video coding standards.

In the example of FIG. 8, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions. Non-limiting examples of processing circuitry that video decoder 300 may include are fixed function circuitry, programmable circuitry, and ASICs.

Prediction processing unit 304 includes a linear model (LM) unit 315, a motion compensation unit 316, and an intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM), including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 8 are illustrated to assist with understanding the operations performed by video decoder 300. The units may be implemented as fixed-function circuits, programmable circuits, ASIC, FPGAs, or a combination thereof. Similar to FIG. 7, fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware.

Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the encoded video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 7).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 7). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

In examples where a current block is encoded using LM prediction, prediction processing unit 304 may determine values of luma samples of a prediction block for the current block. Additionally, inverse transform processing unit 308 may determine values of luma samples of a residual block for the current block. Reconstruction unit 310 may reconstruct the values of the luma samples of the current block based on the values of the luma samples of the prediction block for the current block and the values of luma samples of the residual block for the current block. In some examples, filter unit 312 may apply one or more filters to the reconstructed values of the luma samples of the current block. LM unit 315 may use the reconstructed (and in some examples, filtered) luma samples of the current block, which may be denoted as $rec_L'(i, j)$, to determine predicted chroma samples of the current block (e.g., using equation (2)).

In accordance with one or more techniques of this disclosure, LM unit 315 may determine a boundary luma value; derive a chroma value that corresponds to the boundary luma value; derive a first prediction model and a second prediction model based on the derived chroma value; use the first prediction model to determine a first set of predicted chroma samples of a prediction block for the current block, the first set of predicted chroma samples corresponding to the luma samples of the prediction block that have values less than or equal to the boundary luma value; and use the second prediction model to determine a second set of predicted chroma samples of the prediction block, the second set of predicted chroma samples corresponding to the luma samples of the prediction block that have values greater than the boundary luma value. These actions are described in greater detail elsewhere in this disclosure.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video data) from DPB 314 for subsequent presentation on a display device, such as display device 118 of FIG. 1.

In this manner, video decoder 300 represents an example of a device for decoding video data including a memory configured to store video data, and one or more processing units implemented in processing circuitry and configured to perform example techniques described in this disclosure. For example, the processing circuitry of video decoder 300 (e.g., processing circuitry of LM unit 315) may be configured to determine a boundary luma value. Samples having values less than or equal to the boundary luma value are classified as a first group and samples having values greater than the boundary luma value are classified as a second group. The processing circuitry of video decoder 300 (e.g., processing circuitry of LM unit 315) may be configured to determine a first set of predicted samples of a predicted block for samples of the first group based on a first prediction model having a first parameter and a second parameter, and determine a second set of predicted samples of the predicted block for samples of the second group based on a second prediction model having a third parameter and a fourth parameter.

For example, the first model is $\alpha1*Rec_L'[x,y]+\beta1$ if $Rec_L'[x,y] \leq Threshold$. In this example, the first set of predicted samples of the predicted block are those generated from the first model. The first parameter is $\alpha1$, and the second parameter is $\beta1$. The second model is $\alpha2*Rec_L'[x,$ y]+β2 if Rec$_L$'[x,y]>Threshold. In this example, the second set of predicted samples of the predicted block are those generated from the second model. The third parameter is α2 and the fourth parameter is β2.

The processing circuitry of video decoder 300 (e.g., processing circuitry of LM unit 315) may be configured to determine at least one of the first parameter, second parameter, third parameter or fourth parameter. To determine at least one of the first, second, third, or fourth parameter, the processing circuitry of video decoder 300 (e.g., processing circuitry of LM unit 315) may be configured to determine a first luma sample in the first group having a largest luma value among samples in the first group, determine a first chroma sample corresponding to the first luma sample, determine a second luma sample in the second group having a smallest luma value among samples in the second group, determine a second chroma sample corresponding to the second luma sample, and determine at least one of the first parameter, second parameter, third parameter, or fourth parameter based on the first chroma sample and the second chroma sample. The processing circuitry of video decoder 300 (e.g., processing circuitry of LM unit 315) may be configured to reconstruct the current block based at least in part on the predicted block and a residual block.

As one example, the processing circuitry of video decoder 300 (e.g., processing circuitry of LM unit 315) may determine a derived chroma value based on the first chroma sample and the second chroma sample. To determine at least one of the first parameter, second parameter, third parameter, or fourth parameter based on the first chroma sample and the second chroma sample, the processing circuitry may be configured to determine at least one of the first parameter, second parameter, third parameter, or fourth parameter based on the derived chroma value. For instance, the processing circuitry of video decoder 300 (e.g., processing circuitry of LM unit 315) may determine an average of the first chroma sample and the second chroma sample to determine the derived chroma value.

To determine at least one of the first parameter, second parameter, third parameter, or fourth parameter based on the derived chroma value, the processing circuitry of video decoder 300 (e.g., processing circuitry of LM unit 315) may be configured to determine the first parameter (α1) as being equal to (c−Cy)/(Y1−Yb), determine the second parameter (β1) as being equal to Cy−α1*Yb, determine the third parameter (α2) as being equal to (c−Cx)/(Y1−Ya), and determine the fourth parameter (β2) as being equal to Cx−α2*Ya. In this example, c is equal to the derived chroma value, Cy is equal to second chroma sample, Y1 is equal to the boundary luma value, Yb is equal to the second luma sample, Cx is equal to first chroma sample, and Ya is equal to the first luma sample.

In some examples, the boundary luma value may be such that the predicted samples at the boundary luma value using the prediction models may be the same or within a threshold difference value. For instance, assume that a first predicted sample is equal to the first parameter multiplied by the boundary luma value plus the second parameter, and a second predicted sample is equal to the third parameter multiplied by the boundary luma value plus the fourth parameter. In this example, the boundary luma value is such that a difference (e.g., absolute value of the difference) between the first predicted sample and the second predicted sample is less than a threshold difference value. The threshold difference value may be approximately equal to 0 in some example.

As noted above, video decoder 300 (e.g., LM model unit 315 of video decoder 300) may determine a boundary luma value. Thus, processing circuitry of video decoder 300 (e.g., processing circuitry of LM unit 315) may be configured to determine a boundary luma value. In some examples, the boundary luma value may be such that the predicted samples at the boundary luma value using the prediction models may be the same or within a threshold difference value. For instance, assume that a first predicted sample is equal to the first parameter multiplied by the boundary luma value plus the second parameter, and a second predicted sample is equal to the third parameter multiplied by the boundary luma value plus the fourth parameter. In this example, the boundary luma value is such that a difference (e.g., absolute value of the difference) between the first predicted sample and the second predicted sample is less than a threshold difference value. The threshold difference value may be approximately equal to 0 in some example.

Figure 9A:
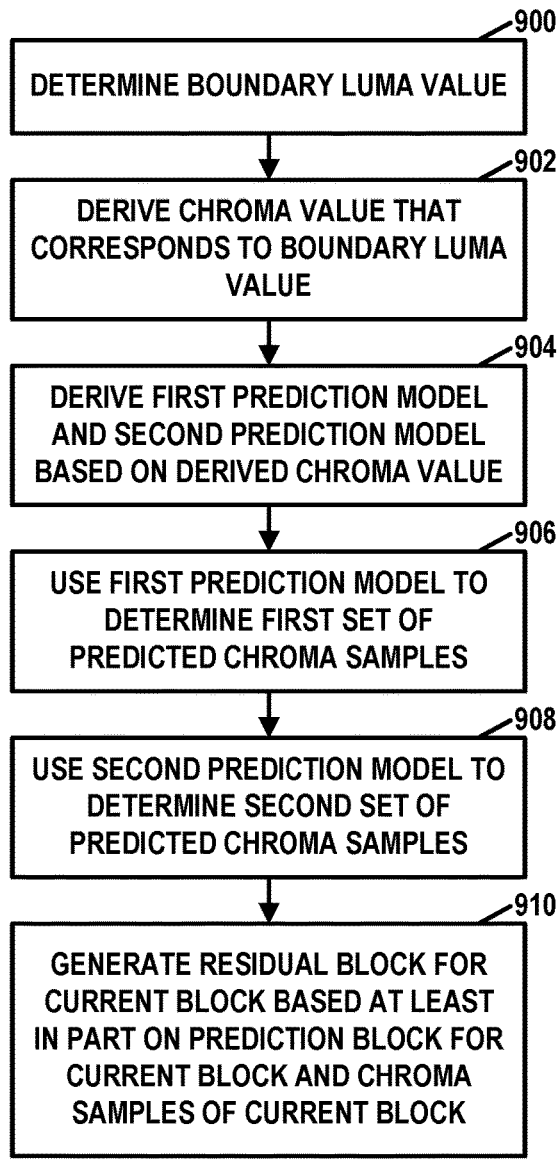
FIG. 9A is a flowchart illustrating an example operation of a video encoder, in accordance with one or more techniques of this disclosure.

FIG. 9A is a flowchart illustrating an example operation of video encoder 200, in accordance with one or more techniques of this disclosure. The flowcharts of this disclosure are provided as examples. Other example operations in accordance with the techniques of this disclosure may include more, fewer, or different actions or actions that are performed in different orders.

In the example of FIG. 9A, video encoder 200 (e.g., LM unit 227 (FIG. 7) of video encoder 200) may determine a boundary luma value that separates a first class of neighboring luma samples and a second class of neighboring luma samples (900). The first class of neighboring luma samples are those ones of the neighboring luma samples that have values less than or equal to the boundary luma value. The second class of neighboring luma samples are those ones of the neighboring luma samples that have values greater than the boundary luma value. The neighboring luma samples neighbor a current block of the video data.

As described elsewhere in this disclosure, video encoder 200 (e.g., LM unit 227) may determine the boundary luma value in one of various ways. For instance, in some examples, video encoder 200 (e.g., LM unit 227) may determine the boundary luma value as a median of values of luma reference samples for the current block. In some examples, video encoder 200 (e.g., LM unit 227) may determine the boundary luma value as an n-th percentile of values of luma reference samples for the current block.

Furthermore, as described elsewhere in this disclosure video encoder 200 may determine a neighborhood containing the set of neighboring luma samples in one of various ways. For instance, in accordance with one of the examples provided elsewhere in this disclosure, video encoder 200 (e.g., LM unit 227) may skip signaling indicating a neighborhood containing the set of neighboring luma samples and may determine that the neighborhood containing the set of neighboring luma samples is twice a width, and/or twice a height of the current block, or the width plus the height of the current block.

Furthermore, in some examples, video encoder 200 (e.g., LM unit 227) may determine that multiple prediction models are used for prediction of chroma samples of the current block (e.g., that a first prediction model and a second prediction model are used) in one of various ways. For instance, in accordance with one of the examples provided elsewhere in this disclosure, video encoder 200 (e.g., LM unit 227) may determine that multiple prediction models are used for prediction of chroma samples of the current block based on a block size of the current block. In accordance with another one of the examples provided elsewhere in this disclosure, video encoder 200 (e.g., LM unit 227) may determine that multiple prediction models are used for prediction of chroma samples of the current block based on whether an intra mode is used by one or more neighboring blocks of the current block.

Furthermore, video encoder 200 (e.g., LM unit 227 (FIG. 7) of video encoder 200) may derive a chroma value that corresponds to the boundary luma value (902). The derived chroma value may be denoted as "c." Video encoder 200 (e.g., LM unit 227) may derive the chroma value in one of various ways, such as accordance to any of the examples provided elsewhere in this disclosure. For example, video encoder 200 (e.g., LM unit 227) may derive the chroma value as an average of a first chroma sample (Cx) and a second chroma sample (Cy). In this example, the first chroma sample corresponds to a luma sample (Y1) having a largest value that is less than or equal to the boundary luma value. In this example, the second chroma sample corresponds to a luma sample (Y2) having a smallest value greater than the boundary luma value. In this example, video encoder 200 (e.g., LM unit 227) may derive the chroma value as an average of the first chroma sample and the second chroma sample. In some examples, video encoder 200 (e.g., LM unit 227) may derive separate Cb and Cr chroma values.

Video encoder 200 (e.g., LM unit 227 (FIG. 7) of video encoder 200) may derive a first prediction model based on the derived chroma value (904). For instance, video encoder 200 (e.g., LM unit 227) may determine a first parameter ($\alpha$1) of the first prediction model as being equal to (c−Cy)/(Y1−Yb), where c is equal to the derived chroma value, Cy is equal to the second chroma sample, Y1 is equal to the boundary luma value, and Yb is equal to the luma sample of the current block having the smallest value greater than the boundary luma value. In this example, video encoder 200 (e.g., LM unit 227) may determine a second parameter ($\beta$1) of the first prediction model as being equal to Cy−$\alpha$1*Yb.

Video encoder 200 (e.g., LM unit 227 (FIG. 7) of video encoder 200) may also determine a second prediction model based on the derived chroma value. For instance, video encoder 200 (e.g., LM unit 227) may determine a first parameter ($\alpha$2) of the second prediction model as being equal to (c−Cx)/(Y1−Ya), wherein Cx is equal to the first chroma sample and Ya is equal to the luma sample of the current block having the largest value that is less than or equal to the boundary luma value. In this example, video encoder 200 (e.g., LM unit 227) may determine a second parameter ($\beta$2) of the second prediction model as being equal to Cx−$\alpha$2*Ya.

Furthermore, in the example of FIG. 9A, video encoder 200 (e.g., LM unit 227 (FIG. 7) of video encoder 200) may use the first prediction model to determine a first set of predicted chroma samples of a prediction block for the current block (906). In this example, the first set of predicted chroma samples corresponds to the luma samples of the prediction block that have values less than or equal to the boundary luma value. Video encoder 200 (e.g., LM unit 227 (FIG. 7) of video encoder 200) may use a second prediction model to determine a second set of predicted chroma samples of the prediction block (908). The second set of predicted chroma samples corresponds to the luma samples of the prediction block that have values greater than the boundary luma value.

Video encoder 200 may use equation (2), presented above, to determine the first set of predicted chroma values and the second set of predicted chroma values using the first prediction model and the second prediction model. In some examples, as part of using the first prediction model to determine the first set of predicted chroma samples of the prediction block, video encoder 200 may multiply the first parameter of the first prediction model by the luma samples of the prediction block and add the second parameter of the first prediction model based on values of the first set of samples of the reconstructed block being less than or equal to a threshold value. As part of using the second prediction model to determine the second set of predicted chroma samples of the prediction block, video encoder 200 (e.g., LM unit 227) may multiply the first parameter of the second prediction model by a second set of samples of the reconstructed block and may add the fourth parameter based on values of the second set of samples of the reconstructed block being greater than the threshold value.

In the example of FIG. 9A, video encoder 200 (e.g., residual generation unit 204 (FIG. 7) of video encoder 200) may generate a residual block for the current block based at least in part on the prediction block for the current block and chroma samples of the current block (910). For example, video encoder 200 (e.g., residual generation unit 204 (FIG. 7) of video encoder 200) may generate the residual block for the current block by determining differences between the values of chroma samples of the prediction block for the current block and corresponding values of chroma samples of the current block.

Figure 9B:
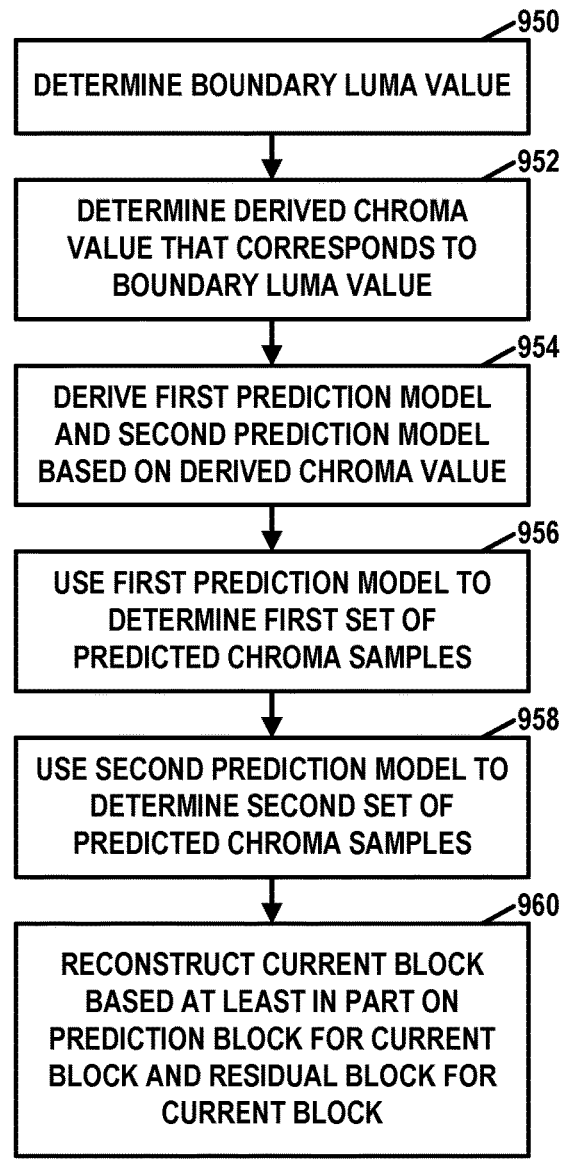
FIG. 9B is a flowchart illustrating an example operation of a video decoder, in accordance with one or more techniques of this disclosure.

FIG. 9B is a flowchart illustrating an example operation of video decoder 300, in accordance with one or more techniques of this disclosure. In the example of FIG. 9B, video decoder 300 (e.g., LM unit 315 (FIG. 8) of video decoder 300) may determine a boundary luma value that separates a first class of neighboring luma samples and a second class of neighboring luma samples (950). The first class of neighboring luma samples are those ones of the neighboring luma samples that have values less than or equal to the boundary luma value. The second class of neighboring luma samples are those ones of the neighboring luma samples that have values greater than the boundary luma value. The neighboring luma samples neighbor a current block of the video data. Video decoder 300 (e.g., LM unit 315) may derive the boundary luma value in the same way as video encoder 200. Furthermore, video decoder 300 (e.g., LM unit 315) may determine a neighborhood containing the neighboring luma samples in the same way as video encoder 200. Video decoder 300 (e.g., LM unit 315) may also determine whether to use multiple prediction models to predict chroma samples of the current block in the same way as video encoder 200.

Furthermore, video decoder 300 (e.g., LM unit 315 (FIG. 8) of video decoder 300) may derive a chroma value that corresponds to the boundary luma value (952). The derived chroma value may be denoted as "c." Video decoder 300 (e.g., LM unit 315) may derive the chroma value in one of various ways. For instance, video decoder 300 (e.g., LM unit 315) may derive the chroma value in the same way as video encoder 200.

Video decoder 300 (e.g., LM unit 315 (FIG. 8) of video decoder 300) may derive a first prediction model based on the derived chroma value (954). Video decoder 300 (e.g., LM unit 315 (FIG. 8) of video decoder 300) may also determine a second prediction model based on the derived chroma value. For instance, video decoder 300 (e.g., LM unit 315) may derive the first prediction model in the second prediction model in the same way as video encoder 200.

Furthermore, in the example of FIG. 9B, video decoder 300 (e.g., LM unit 315 (FIG. 8) of video decoder 300) may use the first prediction model to determine a first set of predicted chroma samples of a prediction block for the current block (956). Video decoder 300 (e.g., LM unit 315 (FIG. 8) of video decoder 300) may use a second prediction model to determine a second set of predicted chroma samples of the prediction block (958). Video decoder 300 (e.g., LM unit 315) may determine the first and second sets of predicted chroma samples in the same way as video encoder 200.

In the example of FIG. 9B, video decoder 300 (e.g., reconstruction unit 310 (FIG. 8) of video decoder 300) may reconstruct the current block based at least in a part on the prediction block for the current block and a residual block for the current block (960). For example, video decoder 300 (e.g., reconstruction unit 310 of video decoder 300) may add values of chroma samples of the prediction block for the current block to corresponding values of chroma samples of the residual block to reconstruct values of chroma samples of the current block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor," "processing circuitry," or "circuit" as used herein may refer to any of the foregoing structures or any other structure suitable for implementation of the techniques described herein, and may be used inter-changeably where appropriate. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

determining a boundary luma value that separates a first class of neighboring luma samples and a second class of neighboring luma samples, the first class of neighboring luma samples being those ones of the neighboring luma samples that have values less than or equal to the boundary luma value, the second class of neighboring luma samples being those ones of the neighboring luma samples that have values greater than the boundary luma value, wherein the neighboring luma samples neighbor a current block of the video data;

determining a first chroma sample and a second chroma sample, the first chroma sample corresponding to a luma sample of the current block having a largest value that is less than or equal to the boundary luma value, the second chroma sample corresponding to a luma sample of the current block having a smallest value greater than the boundary luma value;

deriving a chroma value that corresponds to the boundary luma value based on the first chroma sample and the second chroma sample;

deriving a first prediction model and a second prediction model based on the derived chroma value;

using the first prediction model to determine a first set of predicted chroma samples of a prediction block for the current block, the first set of predicted chroma samples corresponding to the luma samples of the prediction block that have values less than or equal to the boundary luma value;

using the second prediction model to determine a second set of predicted chroma samples of the prediction block, the second set of predicted chroma samples corresponding to the luma samples of the prediction block that have values greater than the boundary luma value; and reconstructing the current block based at least in a part on the prediction block for the current block and a residual block for the current block.

2. The method of claim 1, wherein deriving the chroma value comprises deriving the chroma value as an average of the first chroma sample and the second chroma sample.

3. The method of claim 1, wherein:
deriving the first prediction model comprises:
determining a first parameter ($\alpha 1$) of the first prediction model as being equal to $(c-Cy)/(Y1-Yb)$, wherein c is equal to the derived chroma value, Cy is equal to the second chroma sample, Y1 is equal to the boundary luma value, and Yb is equal to a luma sample of the current block greater than the boundary luma value; and
determining a second parameter ($\beta 1$) of the first prediction model as being equal to $Cy-\alpha 1*Yb$, and
deriving the second prediction model comprises:
determining a first parameter ($\alpha 2$) of the second prediction model as being equal to $(c-Cx)/(Y1-Ya)$, wherein Cx is equal to the first chroma sample and Ya is equal to a luma sample of the current block that is less than or equal to the boundary luma value; and
determining a second parameter ($\beta 2$) of the second prediction model as being equal to $Cx-\alpha 2*Ya$.

4. The method of claim 3, wherein Yb is equal to the luma sample of the current block having the smallest value greater than the boundary luma value and Ya is equal to the luma sample of the current block having the largest value that is less than or equal to the boundary luma value.

5. The method of claim 3,
wherein using the first prediction model to determine the first set of predicted chroma samples of the prediction block comprises multiplying the first parameter of the first prediction model by the luma samples of the prediction block and adding the second parameter of the first prediction model based on values of the first set of samples of the reconstructed block being less than or equal to a threshold value, and
wherein using the second prediction model to determine the second set of predicted chroma samples of the prediction block comprises multiplying the first parameter of the second prediction model by a second set of samples of the reconstructed block and adding the fourth parameter based on values of the second set of samples of the reconstructed block being greater than the threshold value.

6. The method of claim 1, wherein determining the boundary luma value comprises determining the boundary luma value as a median of values of luma reference samples for the current block.

7. The method of claim 1, wherein determining the boundary luma value comprises determining the boundary luma value as an n-th percentile of values of luma reference samples for the current block.

8. The method of claim 1, wherein signaling indicating a neighborhood containing the set of neighboring luma samples is skipped and the method further comprises determining the neighborhood containing the set of neighboring luma samples as being twice a width, twice a height of the current block, or the width plus the height of the current block.

9. The method of claim 1, further comprising determining that the first prediction model and the second prediction model are used based on a block size of the current block.

10. The method of claim 1, further comprising determining that the first prediction model and the second prediction model are used based on whether an intra mode is used by one or more neighboring blocks of the current block.

11. A method of encoding video data, the method comprising:
determining a boundary luma value that separates a first class of neighboring luma samples and a second class of neighboring luma samples, the first class of neighboring luma samples being those ones of the neighboring luma samples that have values less than or equal to the boundary luma value, the second class of neighboring luma samples being those ones of the neighboring luma samples that have values greater than the boundary luma value, wherein the neighboring luma samples neighbor a current block of the video data;
determining a first chroma sample and a second chroma sample, the first chroma sample corresponding to a luma sample of the current block having a largest value that is less than or equal to the boundary luma value, the second chroma sample corresponding to a luma sample of the current block having a smallest value greater than the boundary luma value;
deriving a chroma value that corresponds to the boundary luma value based on the first chroma sample and the second chroma sample;
deriving a first prediction model and a second prediction model based on the derived chroma value;
using the first prediction model to determine a first set of predicted chroma samples of a prediction block for the current block, the first set of predicted chroma samples corresponding to the luma samples of the prediction block that have values less than or equal to the boundary luma value;
using the second prediction model to determine a second set of predicted chroma samples of the prediction block, the second set of predicted chroma samples corresponding to the luma samples of the prediction block that have values greater than the boundary luma value; and
generating a residual block for the current block based at least in part on the prediction block for the current block and chroma samples of the current block.

12. The method of claim 11, wherein deriving the chroma value comprises deriving the chroma value as an average of the first chroma sample and the second chroma sample.

13. The method of claim 11, wherein:
deriving the first prediction model comprises:
determining a first parameter ($\alpha 1$) of the first prediction model as being equal to $(c-Cy)/(Y1-Yb)$, wherein c is equal to the derived chroma value, Cy is equal to the second chroma sample, Y1 is equal to the boundary luma value, and Yb is equal to the luma sample of the current block having the smallest value greater than the boundary luma value;
determining a second parameter ($\beta 1$) of the first prediction model as being equal to $Cy-\alpha 1*Yb$, and
deriving the second prediction model comprises:
determining a first parameter ($\alpha 2$) of the second prediction model as being equal to $(c-Cx)/(Y1-Ya)$, wherein Cx is equal to the first chroma sample and Ya is equal to the luma sample of the current block having the largest value that is less than or equal to the boundary luma value; and determining a second parameter (β2) of the second prediction model as being equal to Cx−α2*Ya.

14. The method of claim 13,
wherein using the first prediction model to determine the first set of predicted chroma samples of the prediction block comprises multiplying the first parameter of the first prediction model by the luma samples of the prediction block and adding the second parameter of the first prediction model based on values of the first set of samples of the reconstructed block being less than or equal to a threshold value, and
wherein using the second prediction model to determine the second set of predicted chroma samples of the prediction block comprises multiplying the first parameter of the second prediction model by a second set of samples of the reconstructed block and adding the fourth parameter based on values of the second set of samples of the reconstructed block being greater than the threshold value.

15. The method of claim 11, wherein determining the boundary luma value comprises determining the boundary luma value as a median of values of luma reference samples for the current block.

16. The method of claim 11, wherein determining the boundary luma value comprises determining the boundary luma value as an n-th percentile of values of luma reference samples for the current block.

17. The method of claim 11, wherein signaling indicating a neighborhood containing the set of neighboring luma samples is skipped and the method further comprises determining the neighborhood containing the set of neighboring luma samples as being twice a width and twice a height of the current block.

18. The method of claim 11, further comprising determining that the first prediction model and the second prediction model are used based on whether an intra mode is used by one or more neighboring blocks of the current block.

19. A device for coding video data, the device comprising:
a memory configured to store the video data; and
processing circuitry coupled to the memory and configured to:
determine a boundary luma value that separates a first class of neighboring luma samples and a second class of neighboring luma samples, the first class of neighboring luma samples being those ones of the neighboring luma samples that have values less than or equal to the boundary luma value, the second class of neighboring luma samples being those ones of the neighboring luma samples that have values greater than the boundary luma value, wherein the neighboring luma samples neighbor a current block of the video data;
determine a first chroma sample and a second chroma sample, the first chroma sample corresponding to a luma sample of the current block having a largest value that is less than or equal to the boundary luma value, the second chroma sample corresponding to a luma sample of the current block having a smallest value greater than the boundary luma value;
derive a chroma value that corresponds to the boundary luma value based on the first chroma sample and the second chroma sample;
derive a first prediction model and a second prediction model based on the derived chroma value;
use the first prediction model to determine a first set of predicted chroma samples of a prediction block for the current block, the first set of predicted chroma samples corresponding to the luma samples of the prediction block that have values less than or equal to the boundary luma value; and
use the second prediction model to determine a second set of predicted chroma samples of the prediction block, the second set of predicted chroma samples corresponding to the luma samples of the prediction block that have values greater than the boundary luma value.

20. The device of claim 19, wherein the processing circuitry is configured to derive the chroma value as an average of the first chroma sample and the second chroma sample.

21. The device of claim 19, wherein:
the processing circuitry is configured, as part of deriving the first prediction model, to:
determine a first parameter (α1) of the first prediction model as being equal to (c−Cy)/(Y1−Yb), wherein c is equal to the derived chroma value, Cy is equal to the second chroma sample, Y1 is equal to the boundary luma value, and Yb is equal to a luma sample of the current block greater than the boundary luma value; and
determine a second parameter (β1) of the first prediction model as being equal to Cy−α1*Yb, and
the processing circuitry is configured, as part of deriving the second prediction model, to:
determine a first parameter (α2) of the second prediction model as being equal to (c−Cx)/(Y1−Ya), wherein Cx is equal to the first chroma sample and Ya is equal to a luma sample of the current block that is less than or equal to the boundary luma value; and
determine a second parameter (β2) of the second prediction model as being equal to Cx−α2*Ya.

22. The device of claim 21, wherein Yb is equal to the luma sample of the current block having the smallest value greater than the boundary luma value and Ya is equal to the luma sample of the current block having the largest value that is less than or equal to the boundary luma value.

23. The device of claim 21,
wherein the processing circuitry is configured, as part of using the first prediction model to determine the first set of predicted chroma samples of the prediction block, to multiply the first parameter of the first prediction model by the luma samples of the prediction block and to add the second parameter of the first prediction model based on values of the first set of samples of the reconstructed block being less than or equal to a threshold value, and
wherein the processing circuitry is configured, as part of using the second prediction model to determine the second set of predicted chroma samples of the prediction block, to multiply the first parameter of the second prediction model by a second set of samples of the reconstructed block and to add the fourth parameter based on values of the second set of samples of the reconstructed block being greater than the threshold value.

24. The device of claim 19, wherein the processing circuitry is configured, as part of determining the boundary luma value, to:
determine the boundary luma value as a median of values of luma reference samples for the current block, or
determine the boundary luma value as an n-th percentile of values of the luma reference samples for the current block.

25. The device of claim 19, further comprising determining that the first prediction model and the second prediction model are used based on one of:
   a block size of the current block, or
   whether an intra mode is used by one or more neighboring blocks of the current block.

26. The device of claim 19, wherein the processing circuitry is configured to perform at least one of:
   reconstructing the current block based at least in part on the prediction block for the current block and a residual block for the current block, or
   generating the residual block for the current block based at least in part on the prediction block for the current block and chroma samples of the current block.

27. A device for coding video data, the device comprising:
   means for determining a boundary luma value that separates a first class of neighboring luma samples and a second class of neighboring luma samples, the first class of neighboring luma samples being those ones of the neighboring luma samples that have values less than or equal to the boundary luma value, the second class of neighboring luma samples being those ones of the neighboring luma samples that have values greater than the boundary luma value, wherein the neighboring luma samples neighbor a current block of the video data;
   means for determining a first chroma sample and a second chroma sample, the first chroma sample corresponding to a luma sample of the current block having a largest value that is less than or equal to the boundary luma value, the second chroma sample corresponding to a luma sample of the current block having a smallest value greater than the boundary luma value;
   means for deriving a chroma value that corresponds to the boundary luma value based on the first chroma sample and the second chroma sample;
   means for deriving a first prediction model and a second prediction model based on the derived chroma value;
   means for using the first prediction model to determine a first set of predicted chroma samples of a prediction block for the current block, the first set of predicted chroma samples corresponding to the luma samples of the prediction block that have values less than or equal to the boundary luma value; and
   means for using the second prediction model to determine a second set of predicted chroma samples of the prediction block, the second set of predicted chroma samples corresponding to the luma samples of the prediction block that have values greater than the boundary luma value.

* * * * *